(12) United States Patent
Brumfield et al.

(10) Patent No.: US 7,389,258 B2
(45) Date of Patent: Jun. 17, 2008

(54) SYSTEM AND METHOD FOR TRADING AND DISPLAYING MARKET INFORMATION IN AN ELECTRONIC TRADING ENVIRONMENT

(75) Inventors: Harris C. Brumfield, Chicago, IL (US); Steven F. Borsand, Deerfield, IL (US); Mark W. Triplett, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 26 days.

(21) Appl. No.: 11/417,534

(22) Filed: May 3, 2006

(65) Prior Publication Data
US 2006/0265316 A1     Nov. 23, 2006

Related U.S. Application Data

(63) Continuation of application No. 10/376,417, filed on Feb. 28, 2003, now Pat. No. 7,228,289, which is a continuation-in-part of application No. 09/590,692, filed on Jun. 9, 2000, now Pat. No. 6,772,132, and a continuation-in-part of application No. 09/589,751, filed on Jun. 9, 2000, now Pat. No. 6,938,011, said application No. 10/376,417 is a continuation-in-part of application No. 09/971,087, filed on Oct. 5, 2001, now Pat. No. 7,127,424.

(60) Provisional application No. 60/325,553, filed on Oct. 1, 2001, provisional application No. 60/238,001, filed on Oct. 6, 2000, provisional application No. 60/186,322, filed on Mar. 2, 2000.

(51) Int. Cl.
*G06Q 40/00*     (2006.01)

(52) U.S. Cl. .......................................... 705/35; 705/37

(58) Field of Classification Search .............. 705/35–45
See application file for complete search history.

(56) References Cited

U.S. PATENT DOCUMENTS 4,674,044 A     6/1987     Kalmus (Continued)

FOREIGN PATENT DOCUMENTS

EP     1067471 A1     1/2001

(Continued)

OTHER PUBLICATIONS

USPTO Presentation, NASDAQ, Nov. 8, 2001.

(Continued)

*Primary Examiner*—Richard Weisberger
(74) *Attorney, Agent, or Firm*—McDonnell Boehnen Hulbert & Berghoff LLP

(57) ABSTRACT

A system and method for trading and displaying market information along a static axis are described to ensure fast and accurate execution of trades. The static axis, whether is a straight axis or a curved one, can be oriented in any direction. Regardless of how the axis is oriented, a first region may display price levels that are arranged along the static axis. A second region, which overlaps the first region, may display one or more indicators for highlighting one of the price levels associated with the lowest offer and one of the price levels associated with the highest bid. Moreover, a third region, which overlaps the first region, may be included for initiating placement of an order to buy or an order to sell the tradeable object through an action of a user input device. Other overlapping regions may also be displayed so that additional market information may be viewed by a trader.

26 Claims, 14 Drawing Sheets

U.S. PATENT DOCUMENTS

| | | | |
|---|---|---|---|
| 4,750,135 A | 6/1988 | Boilen |
| 4,903,201 A | 2/1990 | Wagner |
| 5,038,284 A | 8/1991 | Kramer |
| 5,077,665 A | 12/1991 | Silverman |
| 5,101,353 A | 3/1992 | Lupien |
| 5,136,501 A | 8/1992 | Silverman |
| 5,270,922 A | 12/1993 | Higgins |
| 5,297,031 A | 3/1994 | Gutterman et al. |
| 5,297,032 A | 3/1994 | Trojan |
| 5,689,651 A | 11/1997 | Lozman |
| 5,774,877 A | 6/1998 | Patterson |
| 5,793,301 A | 8/1998 | Patterson |
| 5,797,002 A | 8/1998 | Patterson |
| 5,845,266 A | 12/1998 | Lupien |
| 5,915,245 A | 6/1999 | Patterson |
| 5,924,082 A | 7/1999 | Silverman |
| 5,924,083 A | 7/1999 | Silverman |
| 5,926,801 A | 7/1999 | Matsubara |
| 5,946,667 A | 8/1999 | Tull |
| 5,963,923 A | 10/1999 | Garber |
| 6,012,046 A | 1/2000 | Lupien |
| 6,014,643 A | 1/2000 | Minton |
| 6,035,287 A | 3/2000 | Stallaert |
| 6,098,051 A | 8/2000 | Lupien |
| 6,131,087 A | 10/2000 | Luke |
| 6,134,535 A | 10/2000 | Belzberg |
| 6,195,647 B1 | 2/2001 | Martyn et al. |
| 6,272,474 B1 | 8/2001 | Garcia |
| 6,278,982 B1 | 8/2001 | Korhammer |
| 6,282,521 B1 | 8/2001 | Howorka |
| 6,408,282 B1 | 6/2002 | Buist |
| 6,766,304 B2 | 7/2004 | Kemp |
| 2002/0023038 A1 | 2/2002 | Fritsch |
| 2002/0035534 A1 | 3/2002 | Buist |
| 2002/0055899 A1 | 5/2002 | Williams |
| 2002/0059129 A1 | 5/2002 | Kemp |
| 2002/0073017 A1 | 6/2002 | Robertson |
| 2002/0099644 A1 | 7/2002 | Kemp |
| 2002/0120551 A1 | 8/2002 | Jones |
| 2002/0138401 A1 | 9/2002 | Anne |
| 2003/0004852 A1 | 1/2003 | Burns |
| 2003/0004853 A1 | 1/2003 | Ram |
| 2003/0009411 A1 | 1/2003 | Ram |
| 2003/0023542 A1 | 1/2003 | Kemp |

FOREIGN PATENT DOCUMENTS

| | | |
|---|---|---|
| WO | WO9114231 A1 | 9/1991 |
| WO | WO95/26005 A1 | 9/1995 |
| WO | WO9849639 A1 | 11/1998 |
| WO | WO9919821 A1 | 4/1999 |
| WO | WO99/30259 A1 | 6/1999 |
| WO | WO9953424 A1 | 10/1999 |
| WO | WO00/526191 A1 | 9/2000 |
| WO | WO 00/64176 | 10/2000 |
| WO | WO22/62187 A2 | 10/2000 |
| WO | WO00/62187 A3 | 12/2000 |
| WO | WO00/65510 A1 | 1/2001 |
| WO | WO 01/01077 | 1/2001 |
| WO | WO01/16830 A1 | 3/2001 |
| WO | WO0122315 A3 | 3/2001 |
| WO | WO 01/71557 | 9/2001 |
| WO | WO0165403 A2 | 9/2001 |
| WO | WO01/88808 A1 | 11/2001 |
| WO | WO02103601 A1 | 12/2001 |
| WO | WO02/15461 A2 | 2/2002 |
| WO | WO0229686 A1 | 4/2002 |
| WO | WO01/16852 C1 | 6/2002 |
| WO | WO02/48945 A1 | 6/2002 |
| WO | WO02/59815 A1 | 8/2002 |
| WO | WO02/69226 A2 | 9/2002 |
| WO | WO02/79940 A2 | 10/2002 |
| WO | WO02/93325 A2 | 11/2002 |
| WO | WO 03/017062 | 2/2003 |
| WO | WO03090032 A2 | 10/2003 |
| WO | WO03090032 A3 | 10/2003 |

OTHER PUBLICATIONS

Kharouf, A Trading Room with a View, Futures, 27, Nov. 11, 1998.
www.tradingtechnologies.com/products/xtrade_full.html (viewed May 22, 2001) Jun. 9, 2000.
APT Brochure, LIFFE Exchange, circa 1990.
Trading Screen, INTEX of Bermuda, circa 1984.
Weber, Information Technology in the Major International Financial Markets, Apr. 7, 1993.
Trading Screen, TIFFE Exchange, circa 1989-1990.
Trading Screen, MEFF Exchange, circa 1990.
Cavaletti, Order Routing Article, Futures Magazine, Feb. 1997.
Aurora Article, CBOT, circa 1989.
One Click Trading Options, Trading Technologies, circa 1998.
Trading Screen, SWX Exchange, circa 1990.
Expanding futures and options trading around the world, around the clock, Globex, circa 1989.
Hansell, The computer that ate Chicago, Institutional Investor, Feb. 1989.
Globex Report: An update on the CME Global electronic exchange, Feb. 10, 1989.
NYMEX Access Documents, New York Mercantile Exchange, Feb. 28, 1992.
CATS Traders' Manual, Toronto Stock Exchange, Sep. 30, 1977.
Market Watch, Trading Screen, date not available.
Grummer, Peake, Sellers, Preliminary Feasibility Study, Bermudex Ltd., Nov. 1980.
Peake, Mendellson, The ABCs of trading on a national market system, Appendix C of Preliminary Feasibility Study, Bermudex Ltd., Sep. 1997.
Peake, The last 15 meters, Appendix E of Preliminary Feasibility Study, Bermudex Ltd., Jun. 15, 1997.
Declaration of Brendan Bradley in Case No. 04 C 5312, Nov. 18, 2004.
Memorandum Opinion Published Feb. 9, 2005, of Judge James B. Moran in Case No. 04 C 5312.
Search Report issued by the Australian Patent Office for SG 200406082-8.
Tokyo Stock Exchange ("TSE"), Publication 1, Sep. 1997.
English Translation of TSE "Publication 1".
REFCO English Translation of TSE "Publication 1".
Tokyo Stock Exchange, "Publication 2," Aug. 1998.
English Translation of TSE "Publication 2".
REFCO English Translation of TSE "Publication 2".
Tokyo Stock Exchange, Document 1, Jan. 2000.
English Translation of TSE Document 1.
Tokyo Stock Exchange, "Publication 3", Jul. 31, 2000.
English Translation of TSE "Publication 3".
REFCO English Translation of TSE "Publication 3".
English Translation of TSE Offer Letter.
Information Offer Form, Apr. 18, 2005.
Notification of Information Offer Form, Jun. 3, 2005.
International Search Report for PCT/US04/05911.

600

ES DEC02

| E/W | BidQ | Prc | AskQ |
|---|---|---|---|
| | | 150 | |
| | | 149 | |
| | | 148 | |
| S 0<br>W 10 | | 147 | 10 |
| | | 146 | |
| | | 145 | 15 |
| | | 144 | |
| S 0<br>W 15 | | 143 | 35 |
| | | 142 | 100 |
| | | 141 | 75 |
| | 20 | 140 | |
| B 0<br>W 10 | 125 | 139 | |
| | 75 | 138 | |
| | 20 | 137 | |
| | | 136 | |
| | | 135 | |
| | | 134 | |
| | | 133 | |
| B 0<br>W 10 | 10 | 132 | |

| E/W | BidQ | AskQ | Prc |
|---|---|---|---|
| | | 15 | 145 |
| | | | 144 |
| S 0<br>W 15 | | 35 | 143 |
| | | 100 | 142 |
| | | 75 | 141 |
| | 20 | | 140 |
| B 0<br>W 10 | 125 | | 139 |
| | 75 | | 138 |
| | 20 | | 137 |
| | | | 136 |
| | | | 135 |
| | | | 134 |
| | | | 133 |
| B 0<br>W 10 | 10 | | 132 |
| | | | 131 |
| | | | 130 |
| | | | 129 |
| | | | 128 |
| | | | 127 |

| ES DEC02 | | |
|---|---|---|
| E/W | BidQ | AskQ |
|  |  |  |
|  |  |  |
|  |  |  |
| S 0<br>W 10 |  | 10 |
|  |  |  |
|  |  | 15 |
|  |  |  |
| S 0<br>W 15 |  | 35 |
|  |  | 100 |
|  |  | 75 |
|  | 20 |  |
| B 0<br>W 10 | 125 |  |
|  | 75 |  |
|  | 20 |  |
|  |  |  |
|  |  |  |
|  |  |  |
|  |  |  |
| B 0<br>W 10 | 10 |  |

| BidQ | AskQ | Prc |
|---|---|---|
| | | 150 |
| | | 149 |
| | | 148 |
| | | 147 |
| | | 146 |
| | | 145 |
| | | 144 |
| | | 143 |
| | | 142 |
| | 75 | 141 |
| 20 | | 140 |
| | | 139 |
| | | 138 |
| | | 137 |
| | | 136 |
| | | 135 |
| | | 134 |
| | | 133 |
| | | 132 |

| BidQ | AskQ | Prc |
|---|---|---|
| | | 150 |
| | | 149 |
| | | 148 |
| | | 147 |
| | 25 | 146 |
| | | 145 |
| 50 | | 144 |
| | | 143 |
| | | 142 |
| | | 141 |
| | | 140 |
| | | 139 |
| | | 138 |
| | | 137 |
| | | 136 |
| | | 135 |
| | | 134 |
| | | 133 |
| | | 132 |

1004 1006 1008

Market has moved along the static price level

FIG. 11

| BidQ | AskQ | Prc |
|---|---|---|
| | | 150 |
| | | 149 |
| | | 148 |
| | | 147 |
| | | 146 |
| | | 145 |
| | | 144 |
| | | 143 |
| | | 142 |
| | 75 | 141 |
| 20 | | 140 |
| | | 139 |
| | | 138 |
| | | 137 |
| | | 136 |
| | | 135 |
| | | 134 |
| | | 133 |
| | | 132 |

Graphical Indicators 1102

FIG. 12

| BidQ | AskQ | Prc |
|---|---|---|
| | | 150 |
| | | 149 |
| | | 148 |
| | | 147 |
| | 25 | 146 |
| | | 145 |
| 50 | | 144 |
| | | 143 |
| | | 142 |
| | | 141 |
| | | 140 |
| | | 139 |
| | | 138 |
| | | 137 |
| | | 136 |
| | | 135 |
| | | 134 |
| | | 133 |
| | | 132 |

Graphical Indicators 1202

Market has moved along the static price level

Last re-center 1204

SYSTEM AND METHOD FOR TRADING AND DISPLAYING MARKET INFORMATION IN AN ELECTRONIC TRADING ENVIRONMENT

CROSS-REFERENCES TO RELATED APPLICATIONS

This application is a continuation of U.S. patent application Ser. No. 10/376,417 filed Feb. 28, 2003 which is a continuation-in-part of U.S. patent application Ser. No. 09/590,692, filed Jun. 9, 2000 which claims the benefit of U.S. Provisional Application No. 60/186,322, filed Mar. 2, 2000 U.S. patent application Ser. No. 10/376,417 is also a continuation-in-part of U.S. patent application Ser. No. 09/589/751, filed Jun. 9, 2000, which claims the benefit of U.S. Provisional Application No. 60/186,322. U.S. patent application Ser. No. 10/376,417, is a continuation-in-part of U.S. patent application Ser. No. 09/971,087, filed Oct. 5, 2001, which claims the benefit of U.S. Provisional Application No. 60/238,001, filed Oct. 6, 2000. U.S. patent application Ser. No. 10/376,417, is also a continuation-in-part of U.S. patent application Ser. No. 10/125,894, filed Apt. 19, 2002, which in turn is a continuation-in-part of U.S. patent application Ser. Nos. 09/590,692, 09/589,751 and 09/971,087. U.S. patent application Ser. No. 10/125,894 also claims the benefit of U.S. patent application No. 60/325/553, filed Oct. 1, 2001. The entire content of each of the above-referenced applications is incorporated herein by reference.

FIELD OF INVENTION

The present invention is directed towards electronic trading. Specifically, the present invention is directed to tools for trading tradeable objects that can be traded with quantities and/or prices.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the conditions associated with the order, for example price and quantity, and prioritizes the order with other orders of the same price. When the order conditions are satisfied in the market, a trade occurs and trade information is then relayed in some fashion to one or more client devices. In fact, the host exchanges typically publish a data feed to the client devices so that the traders can have access to the most current market information.

Market information commonly includes information regarding the inside market and market depth. The inside market is the lowest sell price in the market and the highest buy price in the market at a particular point in time. Market depth refers to quantities available at the inside market and may also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all price levels, while some provide only quantities associated with the inside market, and others may provide no market depth at all. Additionally, host exchanges can offer other types of market information such as the last traded price (LTP), the last traded quantity (LTQ), and order fill information.

To profit in electronic markets, market participants must be able to assimilate large amounts of data, including market information provided by an exchange, and react accordingly more quickly than other competing market participants. It is therefore desirable to offer tools that can assist a market participant in adapting his or her strategy to an electronic marketplace, and help the participant to make desirable trades.

BRIEF DESCRIPTION OF THE DRAWINGS

FIG. 6 illustrates a display showing how regions for displaying working orders, bid quantities, ask quantities, and prices situated along a static axis can be rearranged to suit a trader's preferences;

FIG. 7 illustrates a display showing how portions of the price display region may be viewed by manual adjustment;

FIG. 8 illustrates a display showing regions for displaying working orders, bid quantities, ask quantities without the price display region;

FIG. 9 illustrates a display showing regions for displaying bid quantities, ask quantities, and prices situated along a static axis;

FIG. 10 illustrates a display similar to FIG. 9 and displays substantially similar market information as shown in FIG. 9 only at some time in the future;

FIG. 11 illustrates the display of FIG. 9 with the use of indicators to highlight market information associated with the inside market;

FIG. 12 illustrates the display of FIG. 10 with the use of indicators to highlight market information associated with the inside market;

DETAILED DESCRIPTION

As described with reference to the accompanying Figures, the preferred embodiments provide a display and/or trading method to ensure fast and accurate order entry by displaying market information along a static axis. The static axis and order entry concepts have been described in U.S. patent application Ser. No. 09/590,692, filed on Jun. 9, 2000, and entitled, "Click Based Trading With Intuitive Grid Display of Market Depth," the contents of which are incorporated herein by reference. The preferred embodiments are intended to build on the static axis and order entry concepts described in this and other incorporated applications.

According to the preferred system, the display can be custom configured with the options to display working orders, inside market information, fills and market depth information from a single window. Regions in the display of the preferred system, such as a working order region, a bid and ask quantity regions, and price display region can be rearranged on the screen or removed entirely to suit a trader's particular preferences. Indicators can be used to highlight market changes or opportunities in the market. Additionally, the preferred system has a configurable order entry system that gives the user options in performing transactions with an exchange. This increased flexibility in screen layout and order entry nonetheless maintains the display of market information in an intuitive manner so that it allows for immediate reaction to the market's changes.

The preferred embodiments now will be described more fully hereinafter with reference to the accompanying drawings. This invention may, however, be embodied in many different forms and should not be construed as limited to the embodiments set forth herein.

I. Overview of a System Architecture

Figure 1:
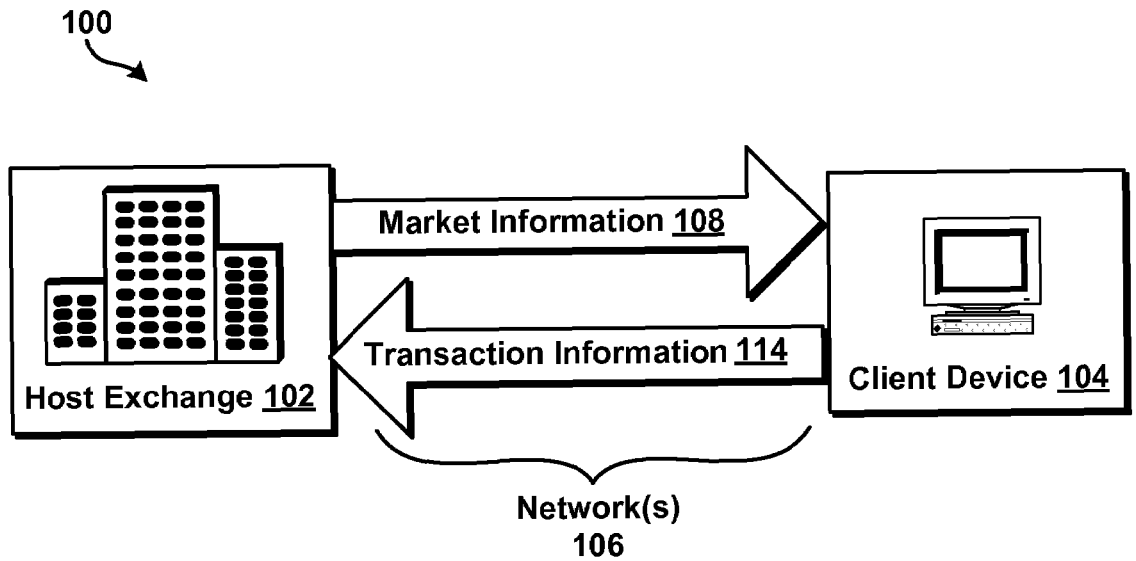
FIG. 1 illustrates a network connection between an exchange and a client site.

FIG. 1 is a block diagram that illustrates an electronic trading system 100 in accordance with the preferred embodiment. The preferred system 100 includes at least one host exchange 102 and two or more client devices, only one of which is illustrated in the Figure as client device 104. Intermediate devices such as gateways, routers, and other such types of network devices may be used to assist client device 104 and host exchange 102 in communicating over network(s) 106. Intermediate devices, additional host exchanges, and additional client devices are not shown in FIG. 1 for sake of clarity.

A. Host Exchange

Host exchange 102 may represent, for example, the London International Financial Futures and Options Exchange ("LIFFE"), the Chicago Board of Trade ("CBOT"), the New York Stock Exchange ("NYSE"), the Chicago Mercantile Exchange ("CME"), the Xetra (a German stock exchange), the European derivatives market ("Eurex"), or any other exchange that participates in electronic trading. Host exchange 102 might also refer to other facilities, which include basic to more complex systems that automatically match incoming orders. These example host exchanges and other host exchanges are well known in the art. Communication protocols required for connectivity to one of these host exchanges are also well known in the art.

As described in the background, a host exchange 102 can implement numerous types of order execution algorithms. Preferably, the preferred embodiments can be adapted by one skilled in the art to work with any particular order execution algorithm. Some example order execution algorithms include first-in-first-out and pro rata algorithms. The first-in-first-out (FIFO) algorithm, used for some markets listed with Eurex for example, gives priority to the first person to place an order. The pro rata algorithm, used for some markets listed with LIFFE for example, splits all orders for the same price. The present invention is not limited to any particular type of order execution algorithm.

Regardless of the type of order execution algorithm used, each host exchange 102 preferably provides similar types of information (referred to as market information 108 in FIG. 1) to subscribing client device(s) 104. Market information 108 may include data that represents just the inside market and may also include market depth. The quantity available at a given price level is usually provided by the host exchange in aggregate sums. In other words, a host exchange usually provides the total buy or the total sell quantity available in the market at a particular price level in its data feed. Market information 108 can contain other types of useful market information such as the last traded price (LTP), the last traded quantity (LTQ), and order fill information. The contents of market information 108 is generally left up to the host exchange 102. Often, however, the host exchange 102 limits the amount of information it sends to client device 104 to save on network bandwidth.

As previously described, the preferred embodiments may be used to trade any tradeable object. As used herein, that the term "tradeable objects," refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

B. Client Device

In the preferred embodiments, client device 104 is a computer that provides an interface for a trader or market participant to trade at one or more markets listed with host exchange 102. An example client device is a personal computer, laptop computer, hand-held computer, and so forth. Client device 104, according to the preferred embodiment, includes at least a processor and memory. The processor and memory, which are both well known computer components, are not shown in the Figure for sake of clarity. Preferably, the processor has enough processing power to handle and process the various types of market information. Of course, the more market information which is received and processed, the more processing power is preferred. However, any present day processor has enough capability to perform at least the most basic part of the preferred embodiments.

Memory may include computer readable medium. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

In the preferred embodiments, client device 104 receives market information 108 from host exchange 102. The market information 108 is received over network(s) 106. Network(s) 106 may include a group of computers and/or associated devices that are connected by communications facilities. Network(s) 106 can involve permanent connections, such as cables, or temporary connections made through telephone or other communication links. Network(s) 106 can be as small as a LAN (local area network) consisting of a few computers, printers, and/or other devices, or it can consist of many small and large computers distributed over a vast geographic area (WAN or wide area network), or it can consist of both types of networks (both LAN and WAN). For instance, the Internet, a well-known collection of networks and gateways, can be used to establish a connection between the client device 104 and the host exchange 102. In another example, wireless networks that send and receive data via radio, infrared optical signaling, or some other technology that does not require a physical connection can be used. There are many different types of networks, and combinations of network types, known in the art that can link client device 104 to the host exchange 102, and the present invention is not limited to any particular network architecture.

According to the preferred embodiments, market information 108 is displayed to the trader(s) on the visual output device or display device of the client device 104. The output device can be any type of display. For example, the display could be a CRT-based video display, an LCD-based or a gas plasma-based flat-panel display, a display that shows three-dimensional images, or some other type of display. The present invention is not limited to any particular type of display.

Upon viewing market information 108 or a portion thereof, a trader may wish to send orders to an exchange, cancel orders in a market, change orders in a market, query an exchange, and so on. To do so, the trader may input various commands or signals into the client device 104, for example, by typing into a keyboard, inputting commands through a mouse, or inputting commands or signals through some other input device (e.g., such as those input devices described with respect to FIG. 3A-3E). Upon receiving one or more commands or signals, the client device 104 preferably generates transaction information 114. For instance, a trader may click a mouse button to initiate an order to buy a tradeable object. Then, transaction information 114 would include an order to buy a particular quantity of the tradeable object at a particular price. There are many different types of messages and/or order types that can be submitted, all of which can be considered various types of transaction information 114. Once generated, transaction information 114 would be sent from client device 104 to host exchange 102 over network(s) 106.

As previously described, FIG. 1 provides an example system 100 overview according to the preferred embodiments. Various changes and/or modifications may be made to the system 100 and still fall within the scope of the present invention. For example, it should be understood that the present invention is not limited to any particular network architecture or configuration such as described with respect to FIG. 1. The present invention may be applied with utility on any electronic device in any network that can be used for electronic trading.

Figure 2:
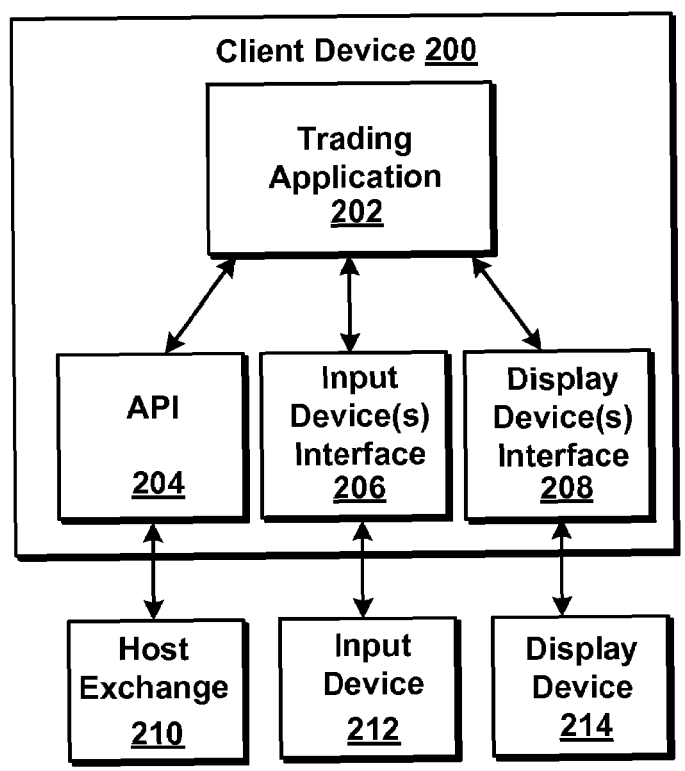
FIG. 2 illustrates a software and/or hardware overview of a client device which is used to implement the preferred embodiments.

FIG. 2 shows an example overview of client device 200 which is substantially similar to client device 104 shown in FIG. 1. Client device 200 can be any type of computing device, examples of which were enumerated above with respect to client device 104. According to the preferred embodiment, client device 200 has trading application 202 stored in memory that when executed arranges and displays market information 108 in many particular ways, usually depending on how the trader prefers to view the information. Preferably, trading application 202 has access to market information 108 through API 204 (or application programming interface) and trading application 202 can also forward transaction information 114 to host exchange 210 via API 204. Additionally, trading application 202 can be given the ability to receive signals from an input device 212 via input device interface 206 and can be given the ability to send signals to display device 214 via display device interface 208. Example input devices are given below with respect to FIGS. 3A-3E.

II. Order Entry

Displaying market information in relation to a static axis allows for exceptional market feel and an intuitive sense of where the market is headed. It is also important and beneficial to provide a reflex-fast order entry system. Therefore, the configurable display of one preferred embodiment enables a trader to send orders by simply clicking in buy and/or sell order entry regions of the display. In another embodiment, buttons on an input device are programmed so that when a particular button is pressed it sends a buy order to the matching engine and that when another button when pressed it sends a sell order to the matching engine. There are numerous input devices that can be used to initiate an order, examples of which are described below with respect to FIGS. 3A-3E. Initiating an order includes sending an order to a host exchange (e.g., see host exchange 102 in FIG. 1) or equivalently, leaving the "hands of the trader." For instance, the client device, a network device, or the host exchange may be programmed to verify certain parameters of the order and later reject it based on the parameters and some other criteria. Then, although the trader initiated the order, the software might still reject it and not send it to the host exchange. Software of this kind might be put into place as a risk management tool, for example.

To enable a trader to quickly send an order to host exchange 102, one or more parameters of an order are preferably based on at least one preset parameter and the location of a cursor on the display. According to one preferred embodiment, an order's quantity is based on a preset quantity while the order's price is based on the location of the cursor on the display. Of course, the preset parameter can be based on something other than quantity such as last traded quantity (LTQ), last traded price (LTP), a theoretical value, price, and so on. Additionally, the preset parameter may be linked to and/or based on a dynamic value or an equation. Similarly, the location of the cursor on the display could refer to a different value besides price, such as yield. A cursor can be an indicator, such as a blinking (or non-blinking) underline or rectangle that marks or highlights a particular place on the screen. In applications that use a mouse, a cursor can be an arrow or other on-screen icon that moves according to the movements of the mouse. In reference to digitizing tablets or touch-screen applications, the location of the cursor is the location where the stylus (or light pen) touches the screen. Each of these input devices and more are described below with respect to FIGS. 3A-3E. Alternatively, it should also be understood that all parameters of an order may be entirely based on the location, in one or more dimensions, of a cursor. For instance, the location of the cursor along an x-axis might represent the order quantity and the location of the cursor along the y-axis might represent the order price.

In an embodiment, the display has one or more regions. Then, the regions can be set up so that one region is an order entry region for buy orders and another region is an order entry region for sell orders. A buy order entry region can be an area dedicated for order entry, or alternatively, the buy order entry region can overlap other regions such as the bid quantity display region. The same is true for a sell order entry region. Then, when an input device used to control the cursor is positioned over one of the order entry regions, and a button is "pressed" an order to buy (if the cursor is positioned over the buy order entry region) or an order to sell (if the cursor is positioned over the sell order entry region) would be sent to the host exchange 102. It should also be understood that the preferred embodiments may have multiple buy regions and/or multiple sell regions. Then, for example, each of the multiple buy regions and each of the multiple sell regions could represent a different order type. Example order types known to one skilled in the art of trading include basket, iceberg, block orders limit, limit-on-close, limit-on-open, market, market-on-close, market-on-open, odd lot, one-cancels-all, relative stop, stop limit, sweep-to-fill, and volume weighted average price.

In another embodiment, buttons or keyboard keys can be programmed that when pressed or selected, a buy order and/or a sell order is automatically sent to the host exchange 102. For example, a mouse might have a least two buttons, a right button and a left button. The right button could be programmed to send an order to sell, while the left button could be programmed to send an order to buy, or vice-versa. Other programmable configurations are possible depending on the type of input device. With respect to keyboard keys, it is possible to map trading functionality to particular keys on a keyboard. For instance, the "A" key might represent entering a buy order at a specified price/quantity, the ";" key might represent entering a sell order at a specified price/quantity, the "S" key might represent delete working bid(s), the "L" key might represent delete working sell(s), and so on. Other trading functionality might include deleting all bids/offers, sweep the bids/offers, trade out, increase/decrease buy side cursor (increase/decrease in price), center buy side cursor, increase/decrease sell side cursor (increase/decrease in price), center sell side cursor, load net position in order quantity entry field, center the market, and so on.

Turning now to FIGS. 3A-3E, examples of various input devices are shown. Of course, other types of input devices known in the art which are not shown in the Figures such as a keyboard can be used. Preferably, each input device can be setup to send orders, or perform other types of trading functionality. Such input signals from the input device preferably forms the basis of transaction information 114 which would be sent to host exchange 102. Additionally, such input signals from the input device may also be used to configure the display or viewing portion of the display. For example, although it is described in more detail below, an input device signal could re-center or re-position a portion of the display that shows market information associated with the inside market.

Figure 3A:
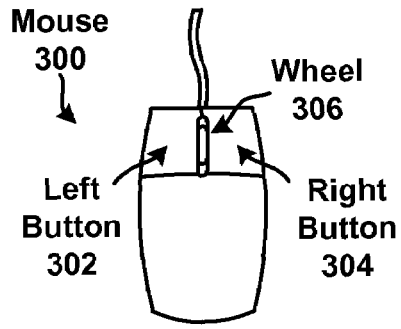
FIGS. 3A-3E illustrates examples of various input devices for use with a client device of the preferred embodiments.

FIG. 3A shows a mouse device 300. Through the mouse device 300, a trader can preferably control an on-screen cursor. In the preferred embodiment, to initiate or send an order to the host exchange 102, the user presses one of the mouse's buttons 302, 304 producing a "mouse click." Then, an order is preferably sent from the client device 104 to the host exchange 102. As described above, in the preferred embodiment, the order is based on at least one preset parameter (e.g., corresponding to quantity) and the location of the on-screen cursor (e.g., corresponding to price). According to one embodiment, if the on-screen cursor is positioned over the buy order entry region and the user presses one of the mouse's buttons 302, 304, it will be an order to buy. If the on-screen cursor is positioned over the sell order entry region and the user presses one of the mouse's buttons 302, 304, it will be an order to sell. According to another embodiment, if a first button is pressed the order will be a buy order. If the second button is pressed the order will be a sell order. The first button and the second button are preferably buttons 302, 304 on the mouse device 300. Preferably, mouse device 300 also has a wheel 306 for navigating menus or displays. For example, the wheel 306 could be used to re-center or re-position the inside market.

Figure 3B:
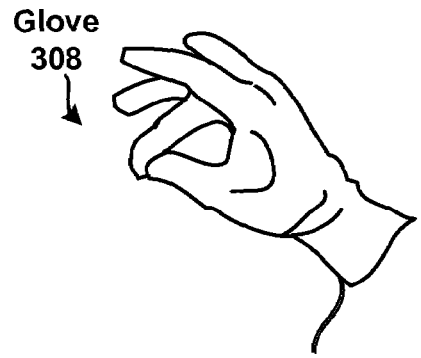

FIG. 3B shows a glove input device 308. The glove input device 308 preferably allows a trader to wear the device over his or her hand and make hand gestures. Sensors placed in various locations around the glove input device 308 measure hand and/or wrist movements. For instance, Immersion 3D Interaction (formerly known as Virtual Technologies, Inc.) has developed the Cyberglove, which is a fully-instrumented glove that provides high-accuracy joint measurements. Immersion 3D Interaction's corporate headquarters is located at 801 Fox Lane, San Jose, Calif. 95131 USA. Hand gestures may be programmed into the system so that when the user desires to send an order, or some other transactional message, the proper hand signal can be made. The glove input device 308 might also control the position of an on-screen cursor, if programmed to do so. Then, to place an order, the user can position the cursor in the appropriate location and send a signal to initiate the order.

Figure 3C:
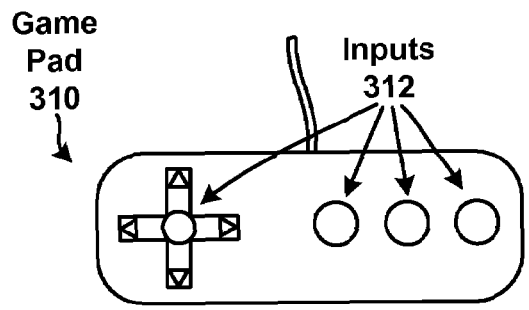

FIG. 3C shows a game pad device 310. The game pad device 310 might be similar to an action game pad device. The game pad device 310 might contain various inputs 312 such as buttons and/or keys and/or a control stick. Preferably, the inputs on the game pad device 310 can be programmed to allow a trader to control actions on the screen such as submitting buy and/or sell orders. For example, one button might be programmed to send buy orders, while another button might be programmed to send sell orders. Or a control stick on the game pad device 310 might control an on-screen cursor, and when the trader is ready to send an order, he or she can position the cursor over a particular region and press a button to send the order.

Other input devices that are similar in nature to the game pad device 310 may also be used. For instance, an airplane control yoke could be used to input various types of information into the system. Additionally, foot pedals could be used to send signals to the system.

Figure 3D:
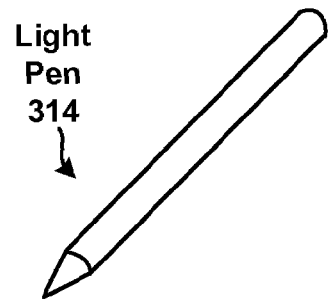

FIG. 3D shows a light pen or stylus 314. The user can point at the screen with the light pen/stylus 314 and send order commands either by pressing a clip on the side of the light pen/stylus 314 or by pressing the light pen/stylus 314 against the surface of the screen. As with other input devices, the type of order submitted is preferably based on at least one preset parameter and the location where the screen is touched by the light pen/stylus 314.

Figure 3E:
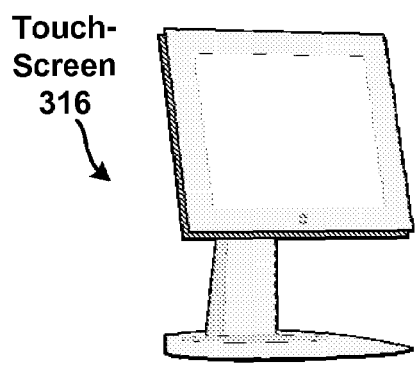

FIG. 3E shows a touch-screen 316. Preferably, by touching the display of the touch-screen 316 either with a finger or a stylus, the user can initiate an order based on at least one preset value. The location of a touch can determine if the order is a buy or sell order. Also, the touch-screen 316, like any input device, can be used to input any type of transactional message.

Again, it should be understood that the present invention is not limited to any particular type of input device or the devices illustrated in FIGS. 3A-3E. Any type of input device may be configured to work with the present invention. Preferably, the input device is configured, however, in a manner so that the trader can quickly and efficiently submit transaction information 114 to the host exchange 102.

Some input devices were described above to illustrate the concept of entering orders into the preferred system. Many of the input devices were described with respect to entering a single order into the market. In the preferred embodiment, however, an input device can be used to enter more than one order at a time, if so desired. Following are some examples to illustrate this feature:

A. EXAMPLE 1

Consider that a trader has entered a pre-set order quantity of 20. Then, assume that the trader clicked down (e.g., press down on a mouse button without releasing) in a sell region at 110.77 and dragged down to 110.68 before releasing. The system may be programmed to highlight the price levels which were selected. Then, in this example, price levels 110.77, 110.76, 110.75, 110.74, 110.73, 110.72, 110.71, 110.70, 110.69, and 110.68 would be highlighted. Once the mouse button is released at 110.68, for example, orders corresponding to the selected price levels would be sent to the exchange. The trader's orders would be as follows: (1) sell 2 at 110.77; (2) sell 2 at 110.76; (3) sell 2 at 110.75; (4) sell 2 at 110.74; (5) sell 2 at 110.73; (6) sell 2 at 110.72; (7) sell 2 at 110.71; (8) sell 2 at 110.70; (9) sell 2 at 110.69; and (10) sell 2 at 110.68. In this example, the system was programmed to divide the pre-set quantity by the number of price levels that the trader dragged through (e.g., pre-set quantity of 20 divided by 10 price levels=orders of size 2).

B. EXAMPLE 2

Instead of dividing the pre-set quantity by the number of orders such as illustrated in example 1, the system may be programmed to enter orders for the pre-set quantity of 20 at each of the 10 price levels. Then, assuming that the trader clicked down in a sell region at 110.77 and dragged down to 110.68 before releasing, the trader's orders would be as follows: (1) sell 20 at 110.77; (2) sell 20 at 110.76; (3) sell 20 at 110.75; (4) sell 20 at 110.74; (5) sell 20 at 110.73; (6) sell 20 at 110.72; (7) sell 20 at 110.71; (8) sell 20 at 110.70; (9) sell 20 at 110.69; and (10) sell 20 at 110.68.

Note that Example 1 and Example 2 show sending orders which have equal quantities among them (e.g., each order in example 1 had a quantity of 2 and each order in example 2 had a quantity of 20). However, it is also envisioned that the quantity for one or more orders may be different from the other orders. For example, the quantity could be based on an equation that depends on how far the price level of the future order is away from the inside market. To illustrate this example, consider an example equation: quantity=pre-set quantity/(number of ticks from the inside market+1). Then, assume that the inside market was 110.68 and the pre-set quantity was 20. Assuming also that the trader clicked down in a sell region at 110.77 and dragged down to 110.68 before releasing, the trader's orders would be as follows: (1) sell 2 at 110.77; (2) sell 2 at 110.76; (3) sell 3 at 110.75; (4) sell 3 at 110.74; (5) sell 3 at 110.73; (6) sell 4 at 110.72; (7) sell 5 at 110.71; (8) sell 7 at 110.70; (9) sell 10 at 110.69; and (10) sell 20 at 110.68.

C. EXAMPLE 3

The trader may enter one or more parameters to set the quantity for each order. Consider that a trader has a pre-set quantity of 100. However, also consider that the trader specified that any one order should be no greater than a 5-lot order. Then, assume that the trader clicked down in a sell region at 110.77 and dragged down to 110.68 before releasing. The trader's orders would be as follows: (1) sell 5 at 110.77; (2) sell 5 at 110.76; (3) sell 5 at 110.75; (4) sell 5 at 110.74; (5) sell 5 at 110.73; (6) sell 5 at 110.72; (7) sell 5 at 110.71; (8) sell 5 at 110.70; (9) sell 5 at 110.69; and (10) sell 5 at 110.68. In this example, the system submitted 10, 5-lot orders (e.g., for a total quantity of 50) to the exchange even though the pre-set quantity was set to 100.

D. EXAMPLE 4

A trader may specify a limit parameter to limit the number of orders which could be selected and sent to the market. Consider when a trader has limited the number of orders which could be dragged into the market to 5 orders. Then, assume that the trader clicked down in a sell region at 110.77 and dragged down to 110.68 before releasing. According to one example, the trader's orders might be limited to the following 5 orders: (1) sell 5 at 110.77; (2) sell 5 at 110.76; (3) sell 5 at 110.75; (4) sell 5 at 110.74; and (5) sell 5 at 110.73. Alternatively, the trader's orders might be limited to the following 5 orders: (1) sell 5 at 110.72; (2) sell 5 at 110.71; (3) sell 5 at 110.70; (4) sell 5 at 110.69; and (5) sell 5 at 110.68. Other combinations may alternatively be selected in response to this action.

E. EXAMPLE 5

A trader may specify a number of orders that would be automatically sent into the market when only a single order is entered by the trader or when only a single action is taken by the trader. For instance, assume that a trader set this multiple order parameter to 5 and that this feature was turned on. Then, assume that the trader entered an order to sell 10 at 110.77. The system may automatically enter 4 more orders, such as two orders above the original order price (e.g., the original order price in this example was 110.77) and two orders below the original order price to give the following 4 additional orders: (1) sell 10 at 110.79; (2) sell 10 at 110.78; (3) sell 10 at 110.76; and (4) sell 10 at 110.75. Alternatively, the preferred system may be programmed to automatically enter 4 orders at other price levels (e.g., at each of the 4 price levels below the original order price or at each of the 4 price levels above the original order price).

In Example 5, the automatically entered orders were entered at price levels based on the original order price. Alternatively, the trader can "preload" the orders for which he or she would like to be automatically entered. In other words, a trader can determine the price levels at which orders should be automatically entered when a designated action takes place. For instance, the system may be programmed to send orders at price levels which are a designated number of ticks away from the inside market. Or, the system may be programmed to send orders, within boundaries, at price levels where an opportunity exists, such as a price level with little or no quantity available (this is illustrated more in Example 6 below). Additionally, the action taken by the trader in Example 5 involved manually sending in a single order, but alternatively, the action or trigger for automatic order entry may be any icon and/or button and/or trigger or groups of buttons/triggers that when pressed and/or selected causes the system to automatically enter the group of orders. For instance, one or more buttons on a game pad could be programmed that when pressed causes the system to automatically enter orders at predetermined price levels.

F. EXAMPLE 6

A trader may click down in a sell region at 110.77 and drag down to 110.68 before releasing, but the system would only send orders at price levels within the region (e.g., 110.77 through 110.68) that have opportunities associated with them. For instance, consider when no or very little quantity was at 110.69 and there was a very large quantity available at 110.68. Then, according to this example, an order would be sent at 110.69, thus filling that opportunity or gap, but an order would not be sent at 110.68 because an opportunity did not exist based on the current order queue. Additionally, the system preferably examines all of the other price levels within that region looking for opportunities to fill with orders. Preferably, the trader can set parameters, such as maximum quantity levels or maximum order numbers, defining when an opportunity exists.

G. EXAMPLE 7

A trader may click down in a sell region at 110.77 and drag down to 110.68 before releasing, yet assume that the lowest sell price at that time was 110.70 and there are offers to buy at 110.69 and 110.68. Then, in this example, if sell orders were placed at 110.69 and 110.68 they would have crossed the market (assuming sufficient buy quantity is represented). However, according to this example, the system preferably refrains from sending those two orders to market and only sends sell orders when they are at or above the inside market. Preferably, it saves those two orders for when the market is equal to or greater than the order price. Then, when the market is equal to the order price, the order may be sent. For instance, if the lowest sell price moves to 110.69, then an order to sell would be sent at 110.69. Moreover, if the lowest sell price moves down to 110.68, then an order to sell would be sent at 110.68.

H. EXAMPLE 8

A trader may program the system to send orders at designated times. For instance, a trader may select or preload orders at various price levels and assign each future order a time at which it will be sent to the exchange. To illustrate, consider when a trader wishes to place three orders in the market. Then, he or she might program the system, in response to a trigger or action, to automatically enter the first order at 1-tick away from the inside market at the present time, enter the second order at 2-ticks away from the inside market in 1000 milliseconds, and enter the third order at 3-ticks away from the inside market in 2500 milliseconds. The trader could use this feature to send multiple orders to an exchange over the course of seconds, minutes, hours, days or even months.

I. EXAMPLE 9

Additionally, the group of orders which have been dragged in may be treated as a group of orders for purposes of moving them, canceling them, changing certain order parameters, and so on. For example, if a trader wished to delete the group, he or she could simply select one of the orders and delete the entire order group. Or, if the trader wished to change the quantity size, he or she could simply change the order size of one of the orders and it would correspondingly change the order size for each of the other orders in the group. Preferably, the trader could select if he or she wanted to treat the orders as a group or as independent orders. One way to do this is by highlighting those orders which the trader wants as a group and selecting a hotkey to group the orders (e.g., on a keyboard, the "Ctrl" key and the letter "g" key). It might also be desirable to have the ability to change or modify order groups.

III. Display of Market Information

As described above, the present invention provides a display and trading method to ensure fast and accurate execution of trades by displaying market information along a static axis. The static axis is described in U.S. Patent Application entitled "Click Based Trading With Intuitive Grid Display of Market Depth," the contents of which have been incorporated above by reference. Accordingly, the values in the price column are static. That is, they do not normally change positions unless a re-centering, re-positioning or other user initiated command (such as clicking on a scroll button) is received. The re-centering/re-positioning command is described more below.

The quantity values displayed in the bid and ask regions are dynamic. For example, they move up and down along the static axis to reflect the inside market and/or market depth for the given tradeable object. So, for example, when the inside market moves up in price, quantities populate the appropriate price levels which using the preferred display shows that the inside market has just moved up. The same is true for when the inside market moves down in price such that quantities populate the appropriate price levels which shows that the inside market has just moved down. Additionally, quantity values displayed in the bid and ask regions are dynamic in the sense that the actual quantity itself may go up or down in magnitude at a particular price level. For example, assume that the best bid price was 60 which had a quantity of 375. Then, assume that the quantity was reduced to 325. Accordingly, the quantity displayed would reflect the new quantity value of 325, but the price of 60 would remain static.

Using the static axis, preferred embodiments of the display are described with respect to example screen shots shown in FIGS. 4-18. According to the preferred embodiments shown in the Figures, as market information changes, one or more indicators move accordingly along a static axis. Additionally, as shown in the Figures, as market information changes, one or more indicators move up or down in magnitude to reflect quantity changes in the market. In some Figures, the static axis is represented by a straight line, while in other Figures the static axis is represented by a curved line. Regardless of whether the static axis is straight or curved, horizontal or vertical (or oriented any other angle), the display and trading methods of the preferred embodiments preferably allow the trader to better visualize movement in the market more quickly.

Figure 4:
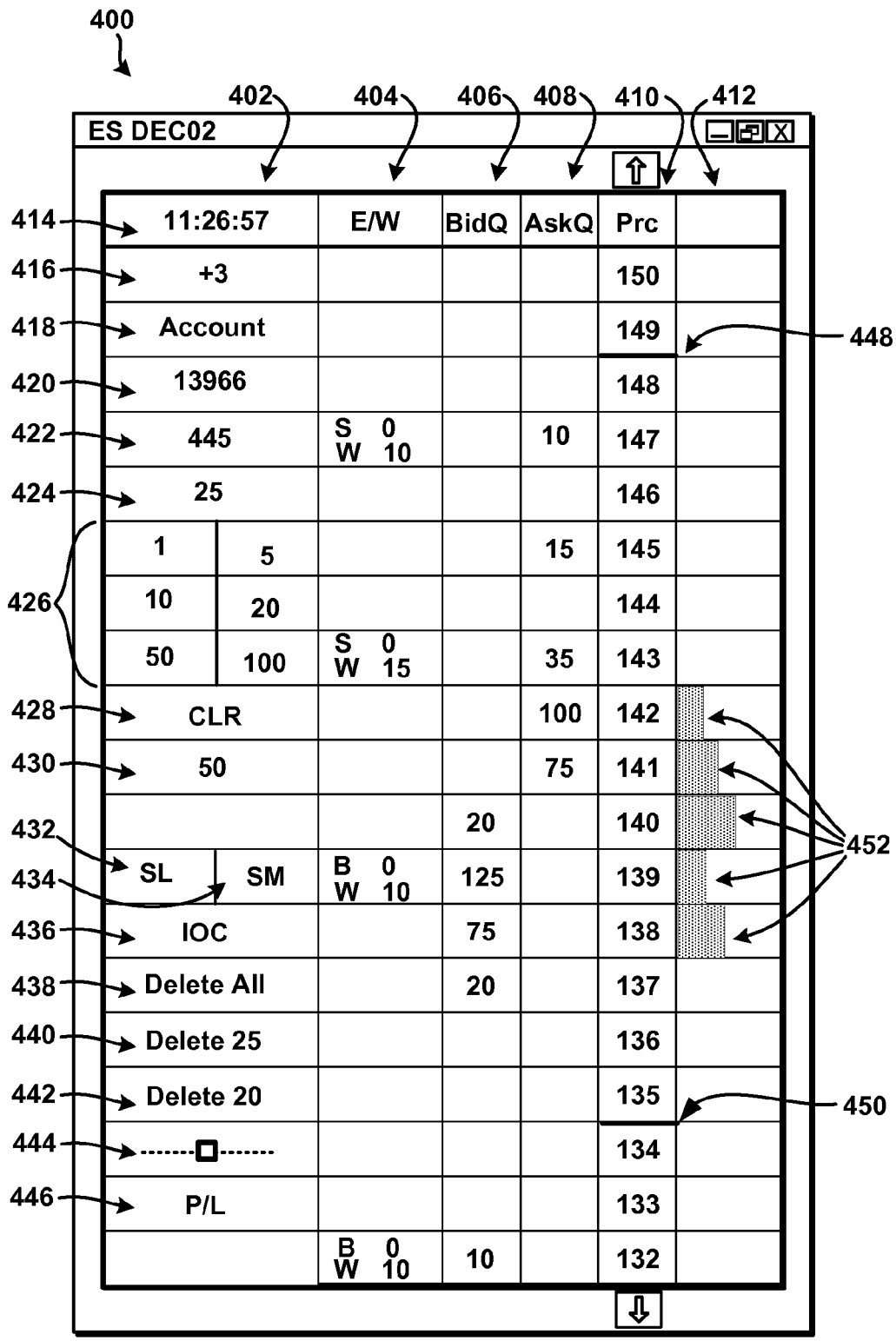
FIG. 4 illustrates a display showing, among other things, the inside market and market depth of an example market.

A general overview of a preferred display is shown with respect to screen 400 in FIG. 4. Many variations of screen 400 are shown in the following Figures. Preferably, a screen can be configured to display more market information or less market information, preferably depending on how the trader configures the screen. This allows greater flexibility for a trader to tailor the screen and the contents displayed to his or her liking. In any event, screen 400 in FIG. 4 provides an example display which provides a large amount of information preferably given in one display window. The grid format dynamically displays market information for a given tradeable object, and preferably enables the trader to enter orders quickly by simply clicking in specific cells of the grid. More detail on the grid format is described below with respect to FIG. 5.

For purposes of illustration, screen 400 has been broken up into regions 402, 404, 406, 408, 410, and 412. Starting first with region 402. Region 402 displays the current time 414. A field at 416 is provided that indicates how far up/down the market is for the day (an example "+3" is shown indicating the market is up 3 price levels). A drop down menu at 418 provides a list of accounts or customers from a drop down customer menu (an example "Account" is shown indicating the customer or account that these trades relate to). A field at 420 is provided that indicates the total number of trades the trader has made so far (e.g., these trades correspond to the example account "Account" set forth in field 418). A field at 422 displays the trader's net position. A field at 424 displays a preset order quantity. Preset order quantity buttons at 426 (referring to "1," "5," "10," "20," "50," "100") can be used to define the preset order quantity displayed at 424. A clear ("CLR") icon 428 is provided to clear the order quantity field at 424. A default quantity field at 430 is provided to input a value which automatically populates the order quantity field at 424. A stop limit order flag at 432 is provided to submit the next order as a stop limit order. A stop market order flag at 434 is provided to submit the next order as a stop market order. An IOC icon at 436 is provided to submit an order as immediate or cancel. A delete all icon at 438 is provided to delete all working orders. A delete offers icon at 440 is provided to delete all of the trader's offers from the market. A delete bids icon at 442 is provided to delete all of the trader's bids from the market. A price consolidation slider at 444 is provided to consolidate price levels and associated market depth. Price consolidation is described in U.S. patent application Ser. No. 09/971,087, entitled "Click Based Trading with Intuitive Grid of Market Depth and Price Consolidation" filed Oct. 5, 2001, the contents of which are incorporated herein by reference. Price consolidation for one or more of the display regions is described in U.S. patent application Ser. No. 10/304,248, entitled "Method and Interface for Consolidating Price Levels on a Trading Screen" filed Nov. 26, 2002, the contents of which are incorporated herein by reference. A field at 446 is provided to provide the profit and loss number ("P/L") which can preferably be programmed to display the profit and loss number for a particular account, for a trader, or for group of traders.

Working quantity region at 404 displays working quantities ("W") and partial executions on that particular bid ("B") or offer ("S"). Alternatively, separate bid working order columns and ask working order columns could be used. Preferably, when an order is completely filled or deleted the values in this region are cleared. Additionally, in the preferred embodiment, working orders may be moved from one price level to another simply by selecting the working order of interest and dragging it to another location at a different price level. Moving working orders from one price level to another is described in U.S. patent application Ser. No. 10/125,894, entitled "Trading Tools for Electronic Trading" filed Apr. 19, 2002, the contents of which are incorporated herein by reference. The system then automatically deletes the previous working order by sending a delete transaction message to the exchange and enters a new order for the same quantity at the new price level. Preferably, when an order is changed, the values in the working quantity region 404 are updated to reflect the changes. The system preferably notifies the exchange of the change.

Bid display region 406 displays current market bid quantities, including those of the trader using the interface, if any. Preferably, the bid display region 406 can display direct market bids in addition to implied market bids. In the illustrated embodiment, the current market bids are aggregate buy quantities that are displayed in association with corresponding price levels. Although numbers are used as current market bid indicators, other types of indicators may be used. For instance, color or color gradients may be used to graphically indicated the number of market bids. In another example, bars may be used such that the length of the bars indicates the number of market bids. The indicators in the bid display region 406 may in addition, be color-coded, segmented or otherwise differentiated to represent a corresponding number of orders and/or the trader's orders in relation to other orders in the market.

Ask display region 408 displays current market offer quantities. Preferably, the ask display region 408 can display direct market offers in addition to implied market offers. In the illustrated embodiment, the current market offers are aggregate sell quantities that are displayed in association with corresponding price levels. Similar to the display of market bids, other types of indicators may be used to indicate the number of market bids and or orders.

Price display region 410 indicates market prices or price levels. Preferably arrows appear at the top and bottom of this region, and when pressed or otherwise activated, the price display region 410 scrolls so that beyond the currently viewable area on the screen can be seen. Other methods may be used to view price levels beyond what is currently viewed such as spinning a wheel on a mouse input device or depressing programmed hot keys, for example. According to one preferred embodiment, line indicators 448, 450 indicate the highest price and the lowest price for which a trade occurred over a time period (e.g., for the last hour of trading, over the course of the day, over the course of the last month, etc.). Using indicators for high prices and low prices is described in U.S. patent application Ser. No. 10/260,643, entitled "System and Method for Displaying Highest and Lowest Traded Prices of Tradeable Objects" filed Sep. 30, 2002, the contents of which are incorporated herein by reference.

A last traded quantity region 412 indicates the last traded quantity ("LTQ") in association with its corresponding price level. The last trade quantity region 412 may also be used to display other useful items of interest. For example, preferably region 412 can be configured to display volume by price in bar, text, or some other format (e.g., see volume bars 452 which indicate the volume traded at various price levels over set time period). Color, for example, may be used to differentiate times within the set period of time. Of course, the LTQ may alternatively be illustrated numerically and, if desired, only the most recent LTQ may be displayed instead of a series of LTQs over a set period of time.

A. An Example Grid Display with a Static Axis

Figure 5:
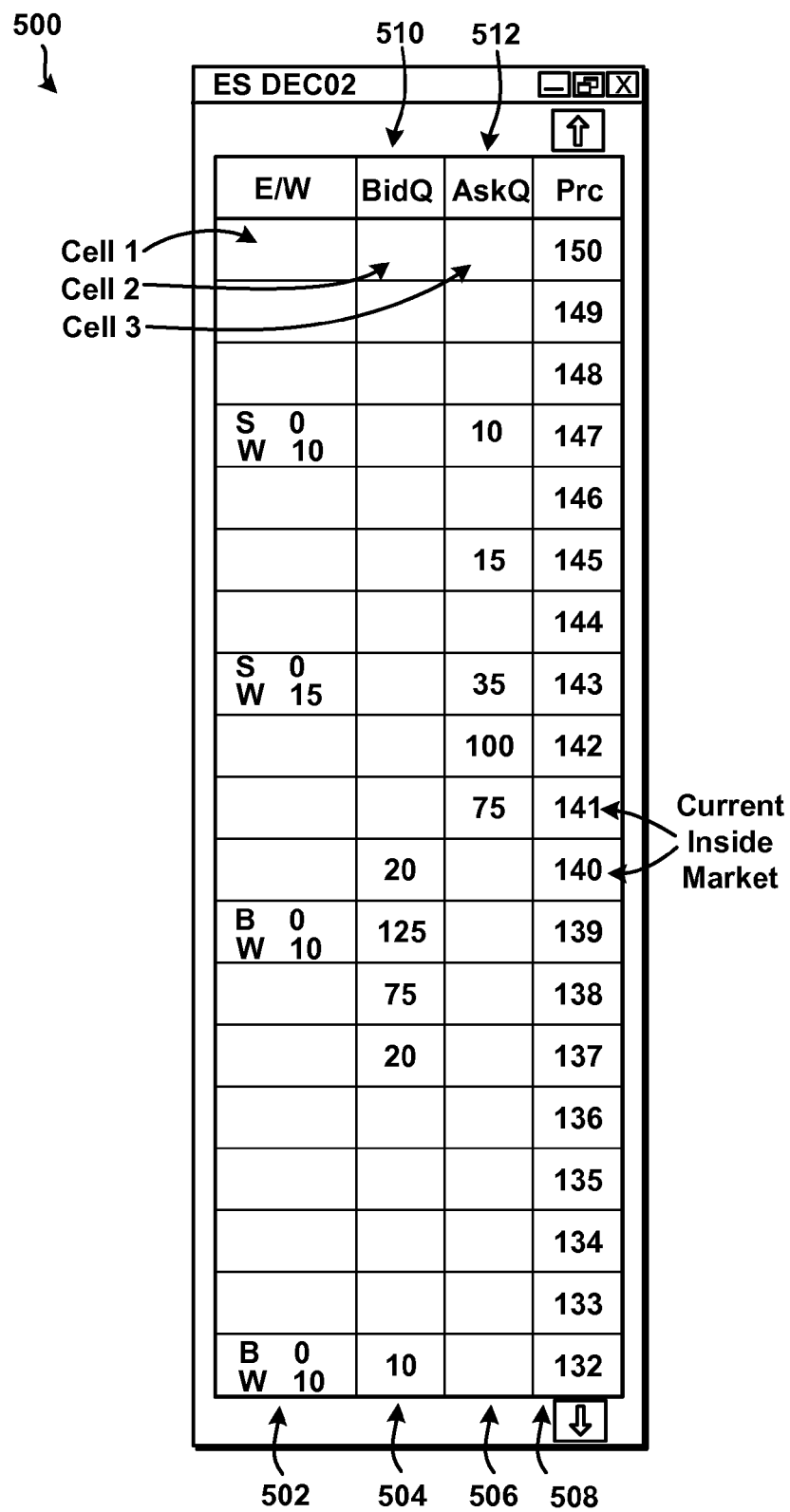
FIG. 5 illustrates a display showing regions for displaying working orders, bid quantities, ask quantities, and prices situated along a static axis.

FIG. 5 shows an embodiment of a trading screen 500, which provides similar market information as screen 400. Screen 500 includes a region for displaying working orders 502, a region for displaying bid quantities 504, a region for displaying ask quantities 506, and a region for displaying prices situated uniformly along a static axis 508. In this example, the various regions are separated and are dedicated for their particular purpose. That is, the regions do not necessarily overlap with each other. Alternatively, however, a portion of or all of the regions may overlap in some fashion, which is described in more detail below with respect to FIGS. 9-16.

According to one preferred embodiment, each region 502, 504, 506, 508 is divided into cells. For example, the working order region 502 has "cell 1," bid quantity display region 504 has "cell 2," ask quantity region 506 has "cell 3," and price display region 508 has a price level of "150." Briefly, "cell 1" displays working orders, "cell 2" displays bid quantity, and "cell 3" displays ask quantity, although this apparent from the Figure. Each region 502, 504, 506, 508 has a cell or location that corresponds to a particular price level. For example, "cell 1," "cell 2," and "cell 3" each correspond to price level "150." Similarly, each region has a cell or location that corresponds to at least price levels "132" to "150." In this example, the price levels are set to 1-tick apart, where a tick is the smallest unit of value for a particular exchange and its tradeable object. In this example, 1-tick represents 1 unit of value. Ticks can be whole numbers (e.g., 1, 2, 3, . . . ) or decimal numbers (e.g., 0.25, 0.50, 0.75, 1.5, . . . ) depending on the exchange and the tradeable object.

Figure 16:
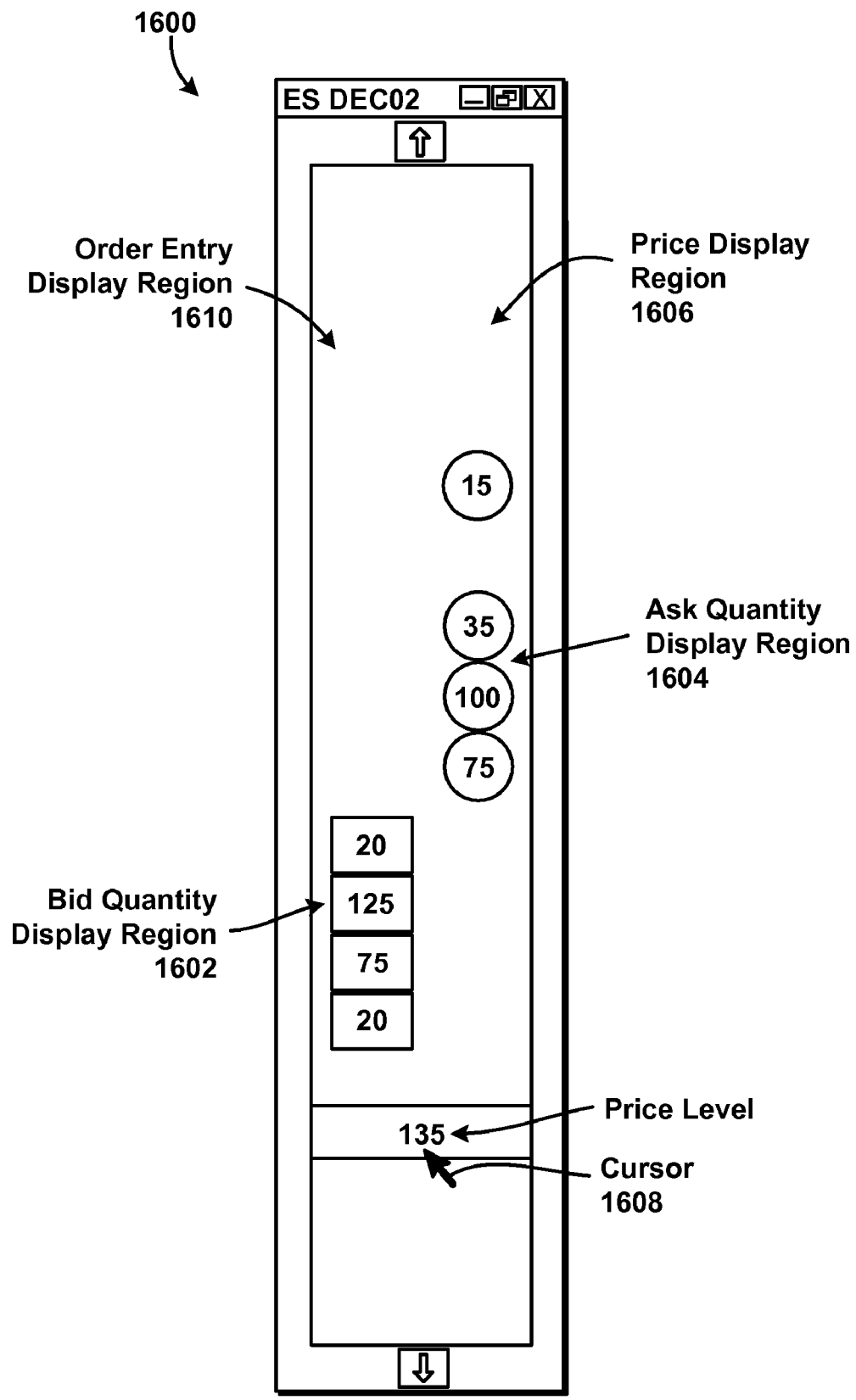
FIG. 16 illustrates a display without the use of graphical borders to divide cells.

According to example trading screen 500, each cell is visually distinguished from each other by a grid of lines or borders. However, the grid is not necessary to distinguish each cell. An example of a display without the grid is shown in FIG. 16. Referring back to screen 500 in FIG. 5, the grid is formed from horizontal and vertical lines making up rows and columns. Each column represents a region 502, 504, 506, 508 and each cell in a column is associated with a particular price level, previously described directly above. Of course, the grid can be angled or placed horizontally. In a horizontal example, each row could represent a region, including the price display region, and each cell in a column might correspond to a particular price level in the price display region.

Preferably, order entry is integrated in some fashion into the grid. According to one embodiment, the screen 500 has a buy order entry region 510 and a sell order entry region 512. In this example, the buy order entry region 510 overlaps with the bid display region 504 and the sell order entry region 512 overlaps with the ask display region 506. So, by positioning a curser over a cell in the bid display region 504 and pressing the proper button, an order to buy the tradeable object for the price associated with the cell is automatically sent to the host exchange 104. By positioning a curser over a cell in the ask display region 506 and pressing the proper button, an order to sell the tradeable object for the price associated with the cell is automatically sent to the host exchange 106. In both examples, each order would preferably include a preset buy and/or sell quantity. The system may be programmed to send the order when a button is depressed (e.g., mouse button pressed down, keypad, touch screen, etc.), or alternatively, the system may send the order when the button is depressed and released (e.g., mouse button pressed down and then released, key pressed down and then released, touch screen touched, etc.).

According to another embodiment, the buy and sell order entry regions 510, 512 overlap the bid and ask display regions 504, 506 and price region 508. So, by positioning a curser over a cell in any of the bid, ask, or price display regions 504, 506, 508 and pressing the proper button (e.g., a left mouse button or any other input device, etc.), an order to buy the tradeable object for the price associated with the cell is automatically sent to the host exchange 104. By positioning a curser over a cell in any one of the bid, ask, or price display regions and pressing the proper button (e.g., a right mouse button or any other input device, etc.), an order to sell the tradeable object for the price associated with the cell is automatically sent to the host exchange 104. In both examples, each order would preferably have a pre-set quantity associated with buy and/or sell. This is one type of example illustrating how order entry regions might overlap display regions. It should be understood that the buy and sell order entry regions can overlap any region of the display.

Alternatively, by positioning a cursor over a cell that is associated with a price level which is less than the best bid, and pressing a button or icon, an order to buy the tradeable object may be automatically sent to the host exchange 104. Similarly, by positioning a cursor over a cell that is associated with a price level which is greater than the best offer, and pressing a button or icon, an order to sell the tradeable object may be automatically sent to the host exchange 104. In these instances, the order is a buy order or a sell order depending on where the cursor is positioned, and not dependent on which button is pressed or selected. Other reference points besides the inside market prices may be used to determine if the order is a buy order or a sell order such as the last traded price or a theoretical price, for example.

According to yet another embodiment, orders may be entered through a buy and/or sell order window (not shown). That is, a trader can open a buy and/or sell window and manually fill in the order parameters such as price and quantity. When the trader is comfortable with the order parameters as displayed in the window, he or she may then submit an order having those parameters to the electronic exchange upon selecting a button. It may also be advantageous to automatically populate the buy and/or sell order window with order parameter information. This can occur by positioning the cursor over a cell associated with a particular price level and pressing a button. Then, the order window will have the corresponding price automatically populated into it. Regardless of how the order parameter information is filled in (e.g., manual or automatic) this alternative embodiment requires the extra step of confirming the order parameters before the order is actually submitted. Therefore, this alternate embodiment may not be as desirable for traders requiring faster order entry systems.

B. Mapping Market Information to Display

As described above, market information might include data that represents just the inside market, where the inside market is the lowest sell price (best offer) and the highest buy price (best bid) for orders in the market. Example market information is displayed in FIG. 5 for illustrating the preferred embodiment. Referring to screen 500 in FIG. 5, the inside market is 140-141, where 140 is the highest bid price and 141 is the lowest ask price. Indicators can be used to graphically indicate the inside market prices to the trader. More on indicators is described below.

Also recall that market information might include market depth, where market depth refers to quantity available at the inside market and can also refer to quantity available at other prices away from the inside market. The amount of market depth information that is available usually depends on the host exchange. That is, one host exchange might provide five levels of market depth (e.g., provide quantity information for 5 price levels on the buy side and for 5 price levels on the sell side), whereas another host exchange might provide no levels of market depth (e.g., provide no quantity), or yet another host exchange might provide unlimited levels of depth. Preferably, the client displays the available levels of market depth assuming that the trader wants to see all of the levels of market depth.

In the example embodiment illustrated in FIG. 5, market depth is shown in the bid and ask display regions 504, 506, respectively. For example, there is an aggregate ask quantity of "75" offered at a price of "141" and there is an aggregate bid quantity of "20" at a price of "140." Quantity available at other prices away from the inside market includes ask quantities of "100," "35," "15," and "10" and includes bid quantities of "125," "75," "20," and "10."

In addition, market information can contain other types of market data such as the last traded price (LTP), the last traded quantity (LTQ), and/or order fill information. LTP and LTQ can be indicated in a separate region not shown in FIG. 5 (e.g., in an LTQ column associated with the price region 508) or they can be indicated within one of the regions in FIG. 5.

According to a preferred embodiment, as market information is received at the client device 104, it is arranged and displayed with reference to a static axis such as shown in the price region 508 of FIG. 5. For instance, the system's software determines that the inside market is near "140" and "141." Therefore, a static price scale is generated having situated along it the inside market prices and prices above/below the inside market based on a pre-set tick, or user-configured, tick size. If quantity is provided in the feed, then it can also be displayed in the appropriate cells that correspond to the correct price levels. For example, an ask quantity of "75" is placed in a cell 514 in the ask quantity display region 506 which corresponds to the price level of "141." Preferably, this process updates the display as new market information 108 is received at the client device 104.

As the market information 108 is received and the display is updated, the price levels preferably remain fixed in their cells within the price region 508. That is, the price levels are displayed statically with respect to the cell or box it is placed in. This is useful as new quantities levels are received via an update, they can be mapped to static price levels corresponding along the static axis, which gives the trader a stationary frame of reference to the changing market data. This allows movements in the market to visually stand out to the trader.

As shown in FIG. 5, working orders to sell "10" and "15" have been placed at price levels of "147" and "143," respectively. Working orders to buy "10" have been placed at price levels "132" and "139." The quantities shown in the bid and ask display regions 504, 506 preferably reflect the quantity from these working orders. That is, if the working order to buy "10" at price level "132" was deleted, no quantity would be shown in the bid display region 504. Alternatively, it is envisioned that the trader could choose to have his or her working orders removed from the bid and ask display regions 504, 506. Then, the trader would view only those quantities due to other traders. The working orders remain fixed in relation to their price levels until the order is filled, the order is moved to a different price level, or the order is deleted.

Additionally, it is envisioned that the traders working in a group can view each other's working orders and also have those working orders removed from the bid and ask display regions 504, 506. If desired, orders due to individual traders could be identified by colors or some other indicator to separate the individual trader's working orders from the group's working orders.

C. Adjusting How Regions Are Displayed

Sometimes it is useful to re-arrange one or more of the regions shown in FIGS. 4 or 5 to better suit the trader's preferences. Thus, in a preferred embodiment, referring to the screen 500 in FIG. 5, the trader is allowed to rearrange the regions of the display. One example of this rearrangement is shown in FIG. 6, which shows a screen that is similar to the example screen 500 of FIG. 5, except that in FIG. 6 the price display region 608 is located between the bid display region 604 and ask display region 606. Notice that the placement of the price display region 608 does not necessarily effect how the market information 108 is displayed. Other regions can also be moved or rearranged on the display, preferably to suit the user's preferences. According to a preferred embodiment, any region can be moved by selecting the region with an input device and dragging it to another desired location.

Sometimes it is useful to see price levels that are currently out of view. For example, the market may move out of view, or a trader wants to place an order a price level not currently shown in the display. Thus, in the preferred embodiment, the display 600 allows the trader to scroll up and down the static axis to view other price levels and market information. Indicators such as arrow icons 614 are displayed to indicate to the trader that he or she can scroll along the static axis. The trader can simply select or press the arrow icons 614 with an input device to move up or down (or along the static axis). A scroll bar may also be used in place of or in addition to the arrow icons. Additionally, a button on an input device can be rotated back and forth to scroll along the axis. For instance, some mouse devices have a wheel that can be spun in two directions. If the wheel is spun in one direction, the trader could scroll in one direction along the static axis. If the wheel is spun in the other direction, the trader could scroll in the opposite direction along the static axis.

FIG. 7 illustrates, in comparison to FIG. 5, the ability to manually adjust which portion of the price display region 708 is displayed. In a preferred embodiment, when arrow up/down icons 714, 716 are depressed, a different portion of the price display region 708 is displayed. In this example illustration, the down arrow icon 716 was depressed so that price levels "127" to "145" are shown. Notice again, that the market depth and working orders remain fixed in relation to their respective price levels when the view is adjusted. If the up arrow 714 was depressed, the price levels shown would increase in magnitude. Market information corresponding to those higher price levels, if any exists, would also be shown.

When the market ascends or descends the price column or the static axis, the inside market might go above or below the price levels of the price display region 708 that are currently displayed on a trader's screen. One could manually adjust which portion of the price display region is displayed, such as described above, or one could use the re-centering or re-positioning feature. That is, the system will re-center or re-position the inside market on the trader's screen. There are many ways to give a re-centering/re-positioning command. For instance, a button or hotkey may be programmed so that when it is pressed, the system automatically re-centers or re-positions the inside market on the screen. Alternatively, when the inside market is near one of the edges of the screen, the system may automatically re-center or re-position the display. The system may be programmed to re-center or re-position around something other than the inside market. For example, the system may be programmed to re-center or re-position around a theoretical price value which is fed into the system from a third-party software application.

Sometimes, it might not be necessary to display certain types of information. For example, some traders are interested in trading based on relative movement of the quantities, without necessarily needing to know the actual prices. Then, it might not be necessary to display actual price levels given that bid and ask quantities move along a static axis. Accordingly, FIG. 8 illustrates the option of removing the actual display of prices along the static axis. However, this does not mean that the static axis is removed, but merely that the price levels situated along the along the axis are not displayed.

D. Displaying Portions of the Market Information

Sometimes it is useful to display only portions of the market information which are relevant to the trader. For example, some traders are interested in viewing market depth at all price levels, whereas some traders are interested in viewing only the market depth at the inside market. Some traders might be interested in viewing only the inside market with no quantity. Because there is variation between what different traders want to have displayed, the preferred embodiment can be configured to display only those portions which are relevant to the trader. Some examples are provided below to illustrate how the display of the preferred embodiments can be configured to display particular portions of the market information.

FIGS. 9 and 10 shows example screens of the preferred embodiments. The example screen 900 displays market depth at 910 at the inside market prices at 912. The screen 900 includes a bid display region 904, an ask display region 906, and a price display region 908 for displaying prices situated along a static axis. Again, as with the other embodiments described herein, more or less market information can be displayed in example screen 900.

FIG. 10 shows screen 1000 that displays substantially similar market information as shown in screen 900 in FIG. 9 only at some time in the future. The inside market 1010 has changed along with quantities associated with the inside market. Price levels positioned along the static axis remain static, but the inside market price moved up to a higher price level. In particular, the inside market has a bid quantity of "50" available at "144" and an ask quantity of "25" at "146." This intuitive display shows the market has moved up in price. It also shows the quantity available at the inside market according to the matching engine. That is, the screen 1000 shows that there is a bid quantity of "50" available at "144" and an ask quantity of "25" at "146."

Similar to the other displays of the preferred embodiment, screen 1000 allows a trader to scroll along the static axis with the up and down arrows, it allows for the regions to be rearranged, it allows other regions to be added such as working order column(s) and column(s) for displaying last traded quantity and last traded price, etc. A benefit, however, of showing few columns in the screen 1000 is that it saves space on the client device's display. Then, a trader can view more markets and/or other types of market information 108 which is fed to the client device and displayed.

FIG. 11 shows the same market information as shown in FIG. 9 with the use of a graphical indicator to highlight the inside market. The graphical indicator in this example is a rectangular block that surrounds the best bid price and its quantity and a rectangular block that surrounds the best ask price and its quantity. Other types of graphical indicators, including colors and/or highlighting, can be used to highlight the inside market or any other relevant portions of market information.

FIG. 12 shows the same market information as shown in FIG. 10. Movement of the graphical indicators along the static axis enable the trader to quickly identify a change in the market. This inside market can go up and down in value along the static axis (or side to side, for example, depending on how the static axis is configured). Referring to FIG. 11 and then FIG. 12, it becomes easier to see how the market information is displayed in an intuitive manner so that it allows for immediate reaction to the market's changes. By quickly viewing that the market has just moved up (e.g., the inside market is moving up in price), a trader can make better decisions about his or her present and future orders.

Additionally, an indicator 1204 may be used to highlight where the inside market was previously. Such an indicator 1204 may appear (or reappear) on the display after the system receives a re-center or re-position command. Then, when the inside market moves away from the indicator 1204, a trader can easily view if the market has moved up or down along the static axis. The indicator 1204 can remain on the screen until the next re-center or re-position command is received in which case the indicator 1204 is moved, or alternatively, the system can be programmed so that the indicator 1204 disappears over time to avoid clutter on the screen, if desired. The indicator 1204 is shown as a line, but it can be other types of indicators including graphical indicators and/or text based indicators.

Figures 13, 14:
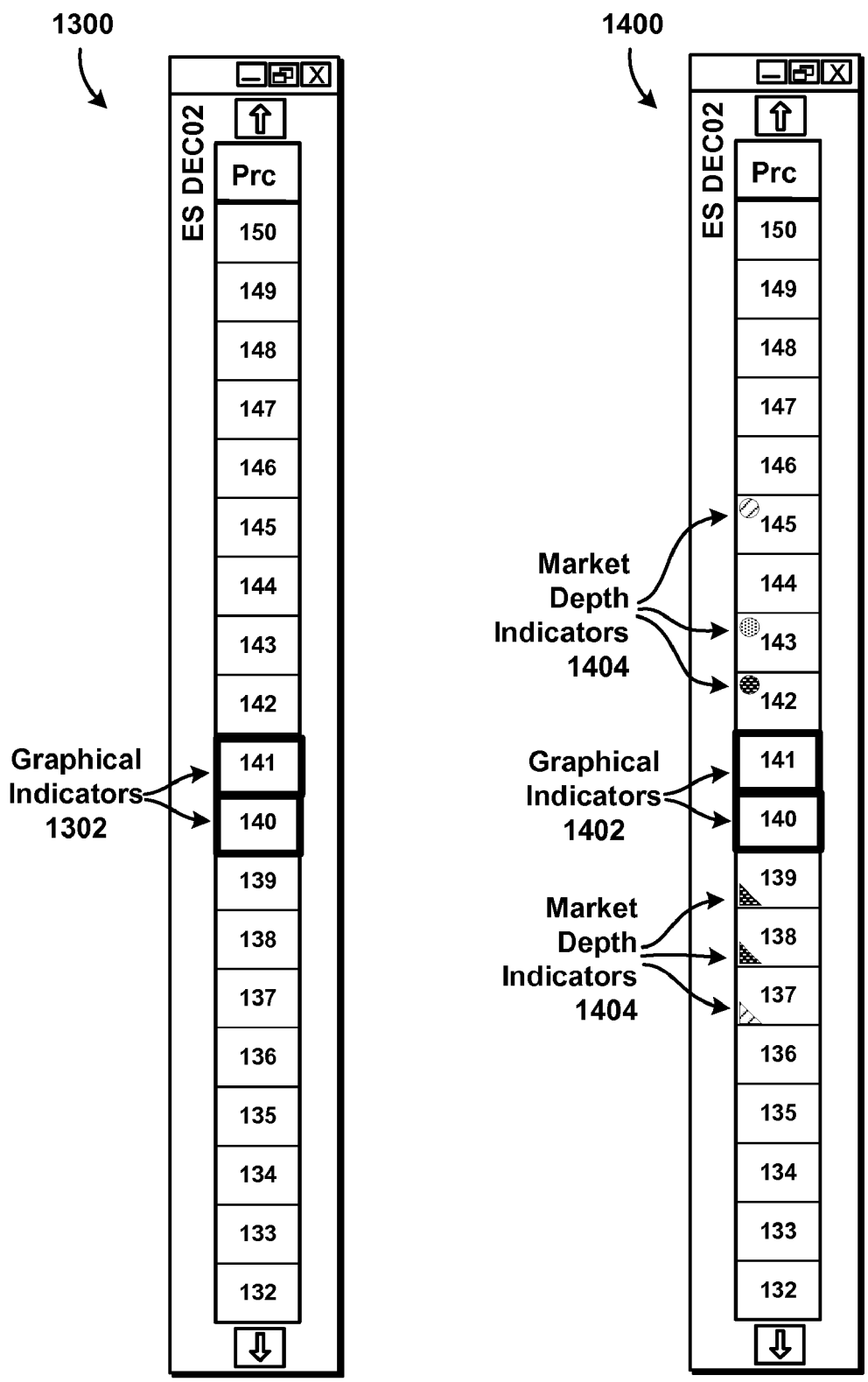
FIG. 13 illustrates a compact display showing only price levels situated along a static axis with the inside market highlighted by indicators.
FIG. 14 illustrates a compact display similar to the display of FIG. 13 with indicators used to indicate market depth.

As previously described above, it is not always necessary to display the price levels (e.g., see FIG. 8). In other circumstances, a trader might want to display only the price levels in the price region. FIG. 13 shows price levels arranged along a static axis. Other regions and indicators, including order entry, can overlap the price region to display even more market information. For example, the inside market is displayed in the price region by numerical and/or graphical indicators. In this embodiment, graphical indicators 1302 surround the lowest ask price of "141" and the highest bid price of "140." Moreover, lines (e.g., a thin line) can be used to indicate price levels with greater accuracy. For instance, a trader may wish to highlight a theoretical price value on her screen and consider when the theoretical price value is 140.5. Then, the system can use a line that is displayed in a location along the price levels which corresponds to 140.5.

FIG. 14 shows substantially the same market information as in FIG. 13 in addition to market depth for price levels different than the inside market. As described directly above, other regions can overlap the price region to display more market information. For instance, the bid display region, the ask display region, and the price display region all overlap. Additionally, the order entry region can overlap those regions. Other regions can overlap the price display regions such as working order display region, or a region for displaying the LTQ and LTP, etc. Preferably, the regions substantially overlap each other to form a more compact display. How much overlap may depend on how compact the trader prefers the display.

Graphical indicators 1402 surround the lowest ask price of "141" and the highest bid price of "140. " Market depth indicators 1404 or numerical text (not shown) can be displayed in the price display region so that the trader can determine quantity levels at various price levels. As shown, shapes are also used to distinguish bid quantities (e.g., triangles) from sell quantities (e.g., circles). Other shapes may be used. Different levels of market depth can be indicated by various shades of depth. For instance, a dark color indicator could indicate a large amount of quantity, a light color indicator could indicate no quantity, and a color gradient could indicate a quantity somewhere in between. The colors could be set to last for a particular period of time and then dissolve. This might be similar to an image formed on a thermal sensing material where the color dissolves over time. Alternatively, a number representing quantity could be positioned inside the cell next to the price. Graphical indicators can also be used to indicate working orders, or last traded quantities, or other useful items of interest that are described herein.

Figure 15:
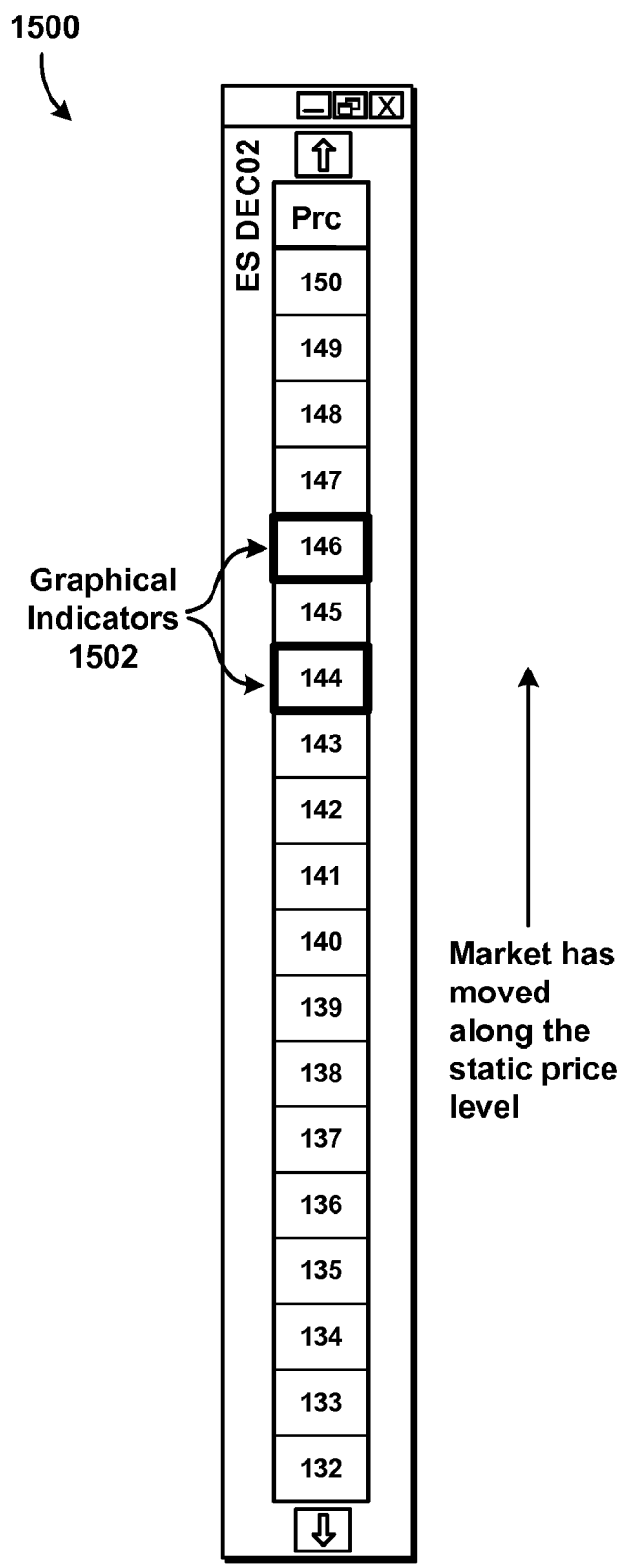
FIG. 15 illustrates the display of FIG. 13 except that the inside market has moved up in price.

FIG. 15 shows the same market as shown in FIG. 13 except that the inside market has moved up in price. As previously described, graphical indicators can be used to highlight the inside market. As the inside market moves, the graphical indicators move to highlight the change. By having information displayed in a simple format such as shown in FIGS. 13-15, changes in the market can be tracked without distraction. Moreover, an indicator can be used to highlight the last re-center position or the last inside market prices, for example.

E. An Example Display Without Cells

FIG. 16 shows an example screen 1600 of another preferred embodiment. The screen 1600 includes a region for displaying bid quantities 1602, a region for displaying ask quantities 1604, and a region for displaying prices (e.g., see 1606) situated along a static axis. In this example, portions of the various regions 1602, 1604, and 1606 overlap. For example, as a cursor 1608 is placed over the display, a price level corresponding to that location appears. This feature is illustrated in FIG. 16 by the cursor, represented by the arrows 1608, placed over the display and, as a result, price level "135" appears. The bid quantity display region 1602 and the ask quantity display region 1604 overlap the price display region 1606. If order entry is wanted in the screen 1600, an order entry region 1610 can be programmed to overlap one or more of the regions (e.g., bid quantity display region 1602, ask quantity display region 1604, and an order entry region 1610). Then, when an order is submitted, it can be based on the price level associated with location of the cursor 1608 and a preset parameter such as quantity. The type of order (e.g., buy or sell order) can be determined many different ways. For instance, the order could be a buy order if the cursor 1608 is in the bid display region, or it could be a sell order if the cursor 1608 is in the ask display region. Alternatively, the order could be a buy order is the cursor 1608 is positioned at or below the best bid price, or it could be a sell order if the cursor 1608 is positioned at or above the best ask price. In yet another embodiment, the order could be a buy or sell order depending on which button is pressed (e.g., right or left mouse button).

Unlike some of the previous displays, screen 1600 does not have cells which are divided by visible borders. In this preferred embodiment, the screen 1600 has locations for displaying information, but the quantity indicators (and other types of indicators) preferably "float" over the display and are positioned with reference to price levels positioned, but not necessarily displayed, along a static axis. This type of screen 1600 where the indicators "float" over the display can be applied to any screen described herein.

F. An Example Display with a Curved Static Axis

Figure 17:
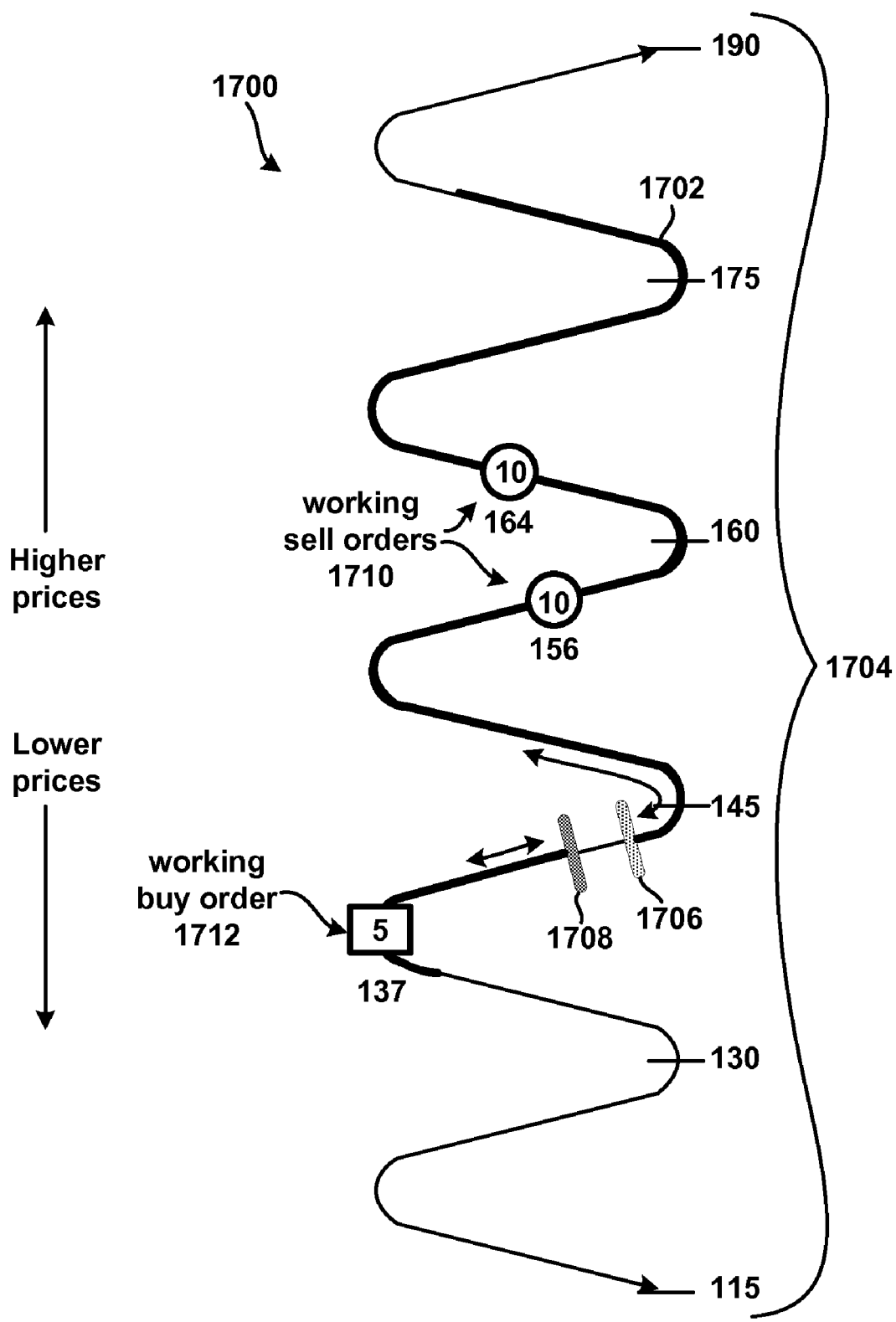
FIG. 17 illustrates a display that implements a curved static axis.
Figure 18:
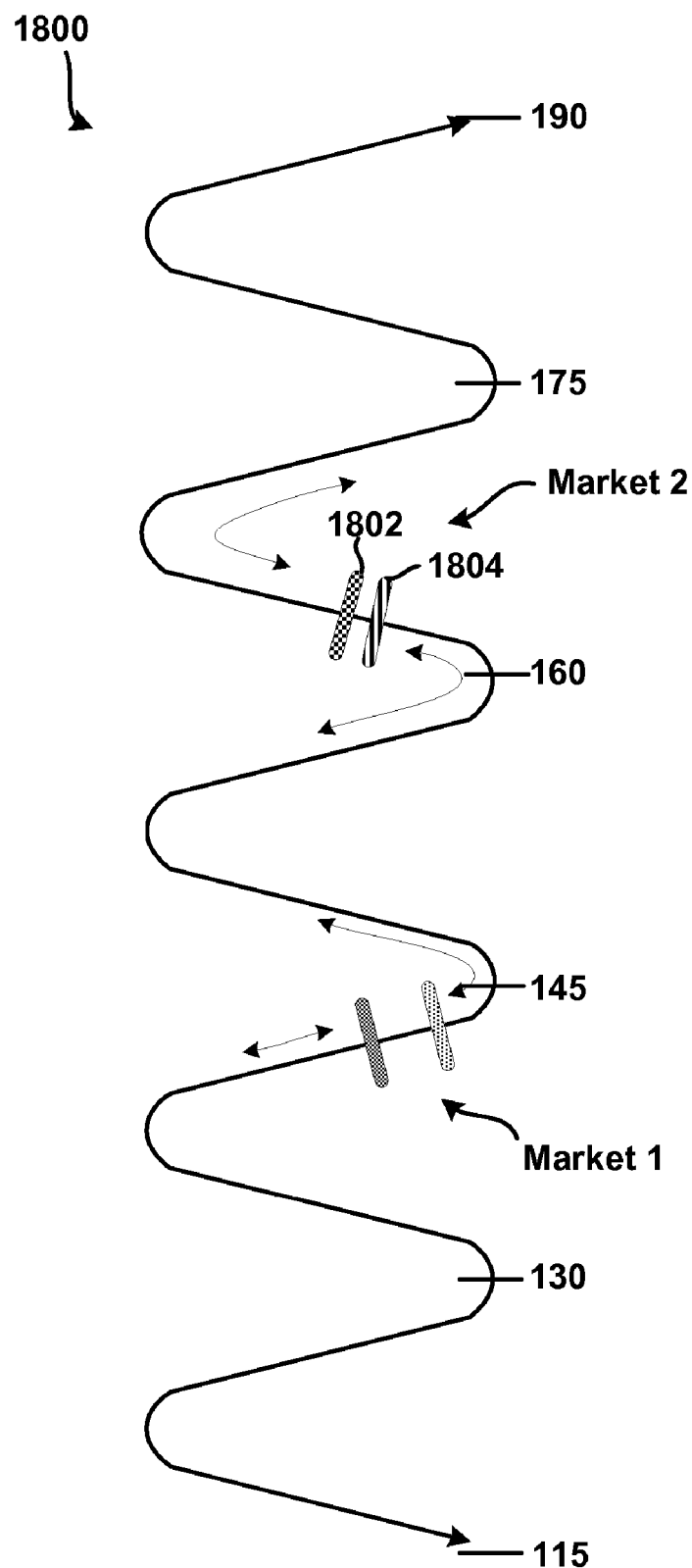
FIG. 18 illustrates a display similar to the display in FIG. 17 with two markets referencing the same static axis.

FIGS. 17-18 show a display that has a static axis, screen 1700 and screen 1800, respectively, but it is curved in shape. By curving the axis, a larger portion of price levels can be shown for the amount of space utilized. The curved axis can be placed vertical as it is in the figure or at any angle. For instance, the axis could be situated horizontally so that it can extend across a standard computer monitor, which are typically wider than they are tall.

Graphical indicators can be used along the curved static axis just as they can be used along a straight static axis. To illustrate some examples, FIG. 17 shows a bold line 1702 which represents price levels 1704 at which trades occurred over a period of time (e.g., the last 30 days, over the last day, over the last hour, etc.). Indicator 1706 shows the lowest ask price and the indicator 1708 shows the highest buy price. Indicators 1706 and 1708 travel along the curved static axis as the market changes. Other indicators can also be used to indicate working orders, or last traded quantities, or other useful items of interest that are described herein. For example, working sell orders 1710 are shown for quantities of 10 each at price levels of 156 and 164, and working buy order 1712 is shown for a quantity of 5 at a price level of 137.

FIG. 18 shows additional indicators 1802, 1804 for indicating the lowest ask price and the highest buy price, respectively, for a second market along the same curved static axis as for the first market. For instance, sometimes it might be useful to normalize the markets and reference them to a common static axis. Consider when two exchanges offer the same product such as 10 year notes. Then, the two markets may be displayed with respect to the same static axis. If necessary, the price levels of the markets could be normalized to account for transaction fees and/or other exchange related fees. Consider also a single stock future offered by one exchange and a stock (related to the single stock future) offered by another exchange. Then, the single stock futures market and the stock market could be normalized (if necessary, to account for any difference in fees or number of shares, etc.) and displayed along a common static axis. Displaying more than one market along a static axis can also apply to a display which utilizes a straight static axis.

IV. Conclusion

There are many advantages for displaying market information in a manner that allows a trader to quickly recognize opportunities at various price points. The numerical/graphical indicators described above can be applied to quantity levels and/or the number of orders at a price level. All of these indicators provide the trader with a way to quickly recognize the quantity of orders at various price points. If the quantity or orders are sufficiently low at a particular price level, a trader may be encouraged to enter an order at that level with the goal of maximizing his chances of getting filled at that level if the market moves in that direction.

One way to display market information is to use color to indicate opportunities to the trader. The color can be used to highlight numbers, text, backgrounds, borders and so on, such that the trader can quickly recognize the color and react accordingly. Shapes can also be used instead of color or in addition to color. For example, a particular shape could be placed near the price levels and/or quantities to indicate an opportunity to the trader. Audio signals can also be used in place of graphical indicators or in addition to graphical indicators. For example, an audible tone could be provided when an opportunity exists. Once the trader is alerted that an opportunity exists, he or she can scan the display for an indicator at the price level where the opportunity exists. Another way to display market information is to use color gradients to show various levels of depth.

The foregoing description is presented to enable one of ordinary skill in the art to make and use the invention. Various modifications to the preferred embodiments will be readily apparent to those skilled in the art and the general principles herein may applied to other embodiments. Therefore, it should be understood that the above description of the preferred embodiments, alternative embodiments, and specific examples are given by way of illustration and not limitation. Many changes and modifications come within the scope and spirit of the following claims and equivalents thereto are claimed as the invention.

We claim:

1. A computer implemented method for displaying market information on a computer display screen relating to and for facilitating trading of a first tradeable object and a second tradeable object being traded on at least one electronic exchange, comprising:
   receiving market pricing bid and ask prices related to a first and a second exchange traded object;
   displaying a first region comprising a plurality of locations, each location corresponding to a price level along a static price axis;
   displaying a second region that substantially overlaps the first region for dynamically displaying a first indicator at a first location of the plurality of locations associated with a first highest bid price corresponding to the first tradeable object, and for dynamically displaying a second indicator at a second location of the plurality of locations associated with a first lowest ask price corresponding to the first tradeable object;
   displaying a third region that substantially overlaps the first region and the second region, the third region for dynamically displaying a third indicator at a third location of the plurality of locations associated with a second highest bid price corresponding to tile second tradeable object, and for dynamically displaying a fourth indicator at a fourth location of the plurality of locations associated with tile second lowest ask price corresponding to the second tradeable object;
   upon receipt of a new first highest bid price or a new first lowest ask price for the first tradeable object, dynamically moving the first indicator to a new first location of the plurality of locations to reflect the new first highest bid price, and dynamically moving the second indicator to a new second location of the plurality of locations to reflect the new first lowest ask price; and
   upon receipt of market a new second highest bid price and a new second lowest ask price for the second tradeable object, dynamically moving the second indicator to a new third location of the plurality of locations to reflect the new second highest bid price, and dynamically moving the fourth indicator to a new fourth location of the plurality of locations to reflect the new second highest bid price.

2. The method of claim 1, further comprising:
   displaying an order entry region comprising a plurality of locations for receiving commands to send trade orders, each location corresponding to a price level along the axis; and
   receiving a command to send a trade order to the electronic exchange, wherein the command results from selecting a particular location in the order entry region corresponding to a desired price level along the price axis as part of a single action, wherein the single action sets a plurality of parameters for the trade order in addition to a default quantity and sends the trade order to the electronic exchange.

3. The method of claim 2, wherein the plurality of parameters comprises the desired price level, and whether the trade order is an order to buy or sell the first tradeable object or the second tradeable object.

4. The method of claim 2, wherein the default quantity is designated to be used for a single trade order.

5. The method of claim 2, wherein the default quantity is designated to be used for a plurality of trade orders.

6. The method of claim 2, wherein the single action consists of a single click of a user input device.

7. The method of claim 2, wherein the single action consists of a double click of a user input device.

8. The method of claim 4, further comprising:
   dynamically displaying an entered order indicator in association with a price level along the axis in the first region.

9. The method of claim 8, further comprising:
   cancelling the trade order in response to a subsequent single action of the user with the pointer of the user input device positioned over the entered order indicator.

10. The method of claim 2, wherein the order entry region substantially overlaps the first region, the second region and the third region.

11. The method of claim 10, wherein the overlapping of the order entry region with the first, second and third regions allows a user to send trade orders to buy the first tradeable object by positioning the cursor over the first indicator and selecting a location corresponding to the first indicator, and wherein overlapping of the order entry region with the first, second and third regions allows a user to send trade orders to sell the first tradeable object by positioning the cursor over the second indicator and selecting a location corresponding to the second indicator.

12. The method of claim 10, wherein the overlapping of the order entry region with the first, second and third regions allows a user to send trade order to buy the second tradeable object by positioning the cursor over the third indicator and selecting a location corresponding to the third indicator, and wherein overlapping of the order entry region with the first, second and third regions allows a user to send trade orders to sell the second tradeable object by positioning the cursor over the fourth indicator and selecting a location corresponding to the fourth indicator.

13. The method of claim 2, further comprising:
   receiving a user input from a user that designates a default quantity to be used for a plurality of trade orders, and receiving a plurality of consecutive commands from a user, each command to send a trade order to the electronic exchange, each trade order having an order quantity based on the default quantity without the user designating the default quantity between the consecutive commands.

14. The method of claim 13, wherein the plurality of trade orders comprises a combination of trade orders to buy or sell.

15. The method of claim 1, further comprising:
   receiving a manual repositioning command to re-position the indicators corresponding to the first tradeable object and the second tradeable object in a window.

16. The method of claim 15, wherein the the indicators are centered in the window upon receiving the repositioning command.

17. The method of claim 15, wherein, upon receiving the manual repositioning command, a new plurality of price levels are associated with the plurality of locations in the first region.

18. The method of claim 1, further comprising:
   automatically repositioning the indicators corresponding to the first and second tradeable objects in a window.

19. The method of claim 18, wherein automatically repositioning comprises automatically re-centering the indicators in the window.

20. The method of claim 1, wherein the axis comprises a single price axis.

21. The method of claim 1, wherein the axis is positioned horizontally.

22. The method of claim 1, wherein the axis is positioned vertically.

23. The method of claim 1, wherein the axis has a curvilinear shape.

24. The method of claim 23, wherein the curvilinear shape forms a substantially circular shape.

25. The method of claim 23, wherein the curvilinear shape forms a substantially elliptical shape.

26. The method of claim 1, wherein the first tradeable object is traded at a first electronic exchange, and wherein the second tradeable object is traded at a second electronic exchange.

\* \* \* \* \*